United States Patent [19]

Tesoro et al.

[11] 3,853,940
[45] Dec. 10, 1974

[54] INNER SALTS OF ALKYL ALKOXYALKYL HYDROXYALKYL SULFONIUM SULFATES

[75] Inventors: Giuliana C. Tesoro, Dobbs Ferry; Andrew Orozlan, Elmhurst, both of N.Y.

[73] Assignee: J. P. Stevens & Co., Inc., New York, N.Y.

[22] Filed: Mar. 22, 1971

[21] Appl. No.: 126,868

Related U.S. Application Data

[60] Division of Ser. No. 227,717, Oct. 2, 1962, abandoned, which is a continuation-in-part of Ser. No. 165,017, Jan. 8, 1962, Pat. No. 3,419,566.

[52] U.S. Cl. ......... 260/458, 260/289 P, 260/289 V, 260/294.8 R, 260/448 R, 260/465.6, 260/506, 260/556 A, 260/568, 260/594, 260/607 A, 260/607 B, 260/607 C, 260/609 F
[51] Int. Cl. .......................................... C07c 141/02
[58] Field of Search ..................................... 260/458

[56] References Cited
UNITED STATES PATENTS

| | | | |
|---|---|---|---|
| 2,121,823 | 6/1938 | Piggot | 260/458 |
| 2,201,814 | 5/1940 | Evans et al. | 260/458 |
| 2,699,991 | 1/1955 | Stayner et al. | 260/458 |
| 3,187,008 | 6/1965 | Baird et al. | 260/327 |

OTHER PUBLICATIONS

E. Gilbert, Sulfonation and Related Reactions, pp. 345–349, (N.Y. 1965).

*Primary Examiner*—Joseph E. Evans
*Attorney, Agent, or Firm*—Browne, Beveridge, DeGrandi & Kline

[57] ABSTRACT

Sulfur containing compounds exemplified by

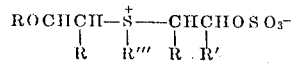

wherein R and R''' are lower alkyl and R is hydrogen or lower alkyl are useful in treating textiles to improve their crease recovery properties.

2 Claims, No Drawings

INNER SALTS OF ALKYL ALKOXYALKYL HYDROXYALKYL SULFONIUM SULFATES

The present application is a divisional of application Ser. No. 227,717 filed Oct. 2, 1962, and now abandoned, which in turn is a continuation-in-part of applicants' application Ser. No. 165,017 filed Jan. 8, 1962, and now U.S. Pat. No. 3,419,566.

This invention relates to a method of stepwise modifying polymeric materials with a polyfunctional reactant in which the functional groups have different reactivity, and to the resulting modified materials so produced; and, more particularly, to a method of cross-linking polymeric materials with the aforementioned polyfunctional reactant wherein one functional group reacts with the polymeric material under one set of reaction conditions and a second functional group reacts subsequently with the material under a different set of reaction conditions, and to the cross-linked materials so produced. The invention further relates to a new and improved group of polyfunctional reactants and the method of making the same.

The modification of polymeric materials to improve particular properties by treating the materials with a polyfunctional reactant is well known. One example is the cross-linking of linear polymers to form a three-dimensional network. Thus, cellulosic textiles have been cross-linked with polyfunctional sulfones, epoxides, N-methylol amides, and the like, in order to modify the properties of the textiles, including those of dimensional stability, resilience, flat-drying, and the like, which properties are not possessed by the textiles in the unmodified state. All of the cross-linking reagents which have been used to date have similar functional groupings, and thus, while the cross-linking process does permit some control of the extent and rate of the reaction by adjusting concentrations, catalysts, temperatures, and the like, it is generally impossible to exercise sufficient control over the cross-linking reaction because the reactive groups combine with the polymer at similar rates, and a three-dimensional network is formed.

A disadvantage with the modification of polymeric materials, such as the cross-linking of cellulosic textiles to improve their properties, is that the modification must generally be carried out as a last step or treatment to which the polymeric material is subjected. For example, if the cellulosic fibers are cross-linked prior to conversion to yarn, or yarns prior to conversion to fabrics, or even fabrics prior to dyeing, serious difficulties are encountered in subsequent processing steps. If a cellulose solution (e.g. "viscose") is reacted with a polyfunctional cross-linking agent, the resulting gel can no longer be spun into fiber by conventional and most economical means. If cellulosic fibers are cross-linked by reacting with a cross-linking agent, their elongation at the breaking point is severely reduced and the resulting fibers therefore difficult to spin into yarns. Because of the foregoing difficulties, the cross-linking modification of the fibers in usually carried out as a final step after the end product, such as the textile fabric, has been formed, and usually after the dyeing of the fabric. Also, because of the foregoing difficulties, the usefulness of the cross-linking processes is limited, their scope restricted, and the modification of the cellulosic fibers must be carried out by the fabric finishers and not by the fiber manufacturers, as would be desirable in some instances.

In connection with the manufacture of garments, it is often advantageous and desirable to obtain creased or pleated fabrics. However, it is not commercially feasible to introduce creases or pleats in finished garments by carrying out the known cross-linking reactions while the garment is in a pleated or creased configuration. Nor is it economically possibly to cut and manufacture garments from fabrics which have already been creased in some areas.

It is also frequently desirable to obtain permanently crimped yarns by carrying out a cross-linking reaction while the yarns are in a super-twisted state, but processing of the yarns in this manner is very difficult.

Accordingly, it is an object of this invention to obviate the present disadvantages and limitations existing in the use of known modifying or cross-linking agents for polymers. agent It is an object of this invention to provide a process for modifying polymeric materials containing active hydrogen atoms by first reacting the materials at any stage of their manufacture with one reactive group of an unsymmetrical, polyfunctional modifying agent, in order to attach the agent to the materials and subsequently during the same or different stage of manufacture, reacting another but different reactive group of the event with an active hydrogen atom of the material so as to effectively cross-link the material and thus modify its properties. For the purpose of the following specification and claims, we define as "active hydrogen" any reactive hydrogen atom which is capable of being added to, being replaced by, or entering into reaction with the functional group of the reagent employed.

It is a further object of this invention to provide a process for modifying polymeric materials having active hydrogen atoms by reacting the materials with an unsymmetrical modifying agent having functional groups of different reactivity on the molecule, wherein one functional group reacts with an active hydrogen of the polymeric material under one set of reaction conditions and the other reactive group reacts with an active hydrogen of the polymeric material under a different set of reaction conditions.

It is another object of this invention to provide a process for modifying polymeric materials containing active hydrogen atoms by reacting the materials with a modifying agent containing polyfunctional unsymmetrical reactive groups which react at widely different rates under the same reactive conditions whereby one functional group is first attached to the polymeric material and subsequently, the second functional group is attached to the polymeric material to effectively cross-link the polymeric material and thus modify its properties.

It is another object of this invention to provide a process for imparting desirable properties to cellulosic fabrics including improved wet and dry crease recovery properties by the stepwise reaction of an unsymmetrical bifunctional cross-linking agent with the cellulose fibers at any stage of fiber processing.

Another object of the invention is to provide a polymer having an unsymmetrical bifunctional cross-linking agent attached thereto as the result of reaction between an active hydrogen atom of the polymer and one of the functional groups of the agent whereby the physicochemical properties of the polymer, such as a cellulosic material, remain substantially the same as those of an untreated polymer, and the change in properties does not occur until the other functional group of the cross-linking agent is reacted with another active hydrogen atom of the polymer and the agent becomes in effect a cross-link.

It is another object of this invention to provide new and useful polyfunctional cross-linking agents for treating polymeric materials including cellulosic materials.

Another object of this invention is to provide processes for forming the aforesaid new and useful polyfunctional cross-linking agents.

A further object of this invention is to provide polymeric materials having an unsymmetrical polyfunctional compound attached thereto by the reaction of one functional group with an active hydrogen of the material, which treated polymeric material is capable of further and subsequent reaction between the remaining functional groups and other hydrogen atoms of the material whereby the properties of the material may be modified by such subsequent reaction.

It is a further object of this invention to provide a method of cross-linking cellulosic fibers by treating the cellulosic material with a bifunctional compound under one set of reaction conditions wherein one functional group of the compound reacts with the cellulosic material, and subsequently subjecting the treated cellulosic material to a different set of reaction conditions wherein the second functional group of the compound reacts with the cellulose to modify the properties of the cellulosic material.

It is a further object of this invention to provide a process for the manufacture of garments which are permanently creased or pleated from fabrics containing reactive side chains by completing the cross-linking reaction while the finished garment is in the desired configuration.

It is a further object of this invention to provide a process for the preparation of reactive sizing and pigment binder materials whereby said materials are reacted with a difunctional compound to link one functional group of said compound with the materials and subsequently subjected to curing to achieve insolubilization of said materials on a textile fabric.

It is still a further object of this invention to provide a process for obtaining a permanently crimped yarn by completing the crosslinking reaction while yarn containing reactive side chains is in a super-twisted configuration and thereafter detwisting the yarn.

In attaining the objects of this invention one feature resides in modifying a polymeric material containing active hydrogen atoms by reacting the material with an unsymmetrical bifunctional modifying agent having one functional group reacting with the active hydrogen atoms of the polymeric material under exceedingly mild conditions and the other reactive group entering into reaction with the active hydrogen atoms when heated to a temperature of at least 100°C. in the presence of a suitable catalyst. Alternatively, one functional group of the reagent can be inert under alkaline conditions and react with the active hydrogen atoms of the polymeric material under acidic conditions, while the second functional group reacts under alkaline conditions, so that a stepwise reaction can be achieved by providing acidic and alkaline conditions of catalysis in separate steps.

A specific feature resides in having the unsymmetrical polyfunctional cross-linking agent of the invention contain at least one reactive group which is reactive at ambient temperatures with the active hydrogen atoms of cellulose and in having the cross-linking agent contain another reactive group which is an activated oxyethyl group which reacts at higher temperatures, so that substantially complete control over the modification process can be achieved.

Other objects, features, and advantages of the invention will be more apparent from the following disclosure of the invention.

To modify or cross-link polymers having active hydrogen atoms, the polymers are reacted with an unsymmetrical polyfunctional compound of the formula

wherein Q is an organic radical, X is a functional group and Y is a functional group which differs from X in structure and reactivity. The reaction takes place under conditions whereby only one functional group reacts with an active hydrogen of the polymer, and subsequently the treated polymer is subjected to a set of reaction conditions wherein the other functional group of the compound reacts with still another active hydrogen of the polymer. When the polymer is a cellulosic material, the compound X-Q-Y can be attached to the cellulose molecules by reaction of the functional group X with the hydrogen in a hydroxyl group of the cellulose molecule under a particular set of reaction conditions. To cross-link the cellulosic material, the treated material is subjected to the particular reaction conditions which enable the functional group Y to react with an active hydrogen of the cellulose molecules. Alternatively, the reaction conditions may be the same but X and Y have the properties of reacting at widely different rates under such conditions.

It has been found that excellent results are obtained when a polymeric material having active hydrogen atoms is treated with an unsymmetrical, difunctional modifying agent having the formula:

(I) 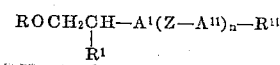

in which a. R is selected from the group consisting of hydrogen, lower alkyl and lower acyl, b. $R^1$ is selected from the group consisting of hydrogen and lower alkyl, c. $A^1$ and $A^{11}$ are selected from the group consisting of

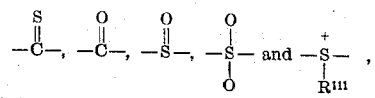

wherein $R^{111}$ is selected from the group consisting of substituted and unsubstituted alkyl and aralkyl radicals, d. Z is a bivalent organic radical selected from the group consisting of alkylene, aralkylene, the residue of a diamine

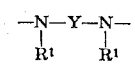

in which Y is a divalent organic radical and $R^1$ has the same definition as above, the residue of a heterocyclic diamine $$-N\underset{\smile}{\overset{\frown}{\text{D}}}N-$$

in which the two nitrogen atoms are part of the heterocyclic ring D, the residue of a substituted or unsubstituted hydrazine radical:

$$-\underset{R^1}{N}-\underset{R^1}{N}-$$

and a nitrogenous residue $$-\underset{R^1}{N}-$$

wherein $R^1$ has the same meaning as above.
  e. n is either 0 or 1,
  f. $R^{11}$ is a member selected from the group consisting of (1) $-\underset{R^1}{C}=\underset{R^1}{CH}$ (2) $-\underset{R^1}{CH}-\underset{R^1}{CH}-A$ in which A is selected from the group consisting of a polar residue derived from a reagent of weak nucleophilic character and the aziridinyl residues (3)

$$-N\begin{matrix}\diagup C\diagdown \\ \diagdown C\diagup \\ H\end{matrix}\begin{matrix}R^1 \\ R^1 \\ R^1 \\ R^1\end{matrix}$$

and $-N\begin{matrix}\diagup C\diagdown \\ \diagdown C\diagup \\ H\end{matrix}\begin{matrix}R^1 \\ R^1 \\ R^1 \\ R^1\end{matrix}$ where $R^1$ in each of the formulas has the meaning defined above, namely, a member selected from the group consisting of hydrogen and lower alkyl.

Representative compounds coming within the definition of Formula I include $$CH_3OCH_2CH_2SO_2CH=CH_2$$

$$CH_3OCH_2\underset{CH_3}{\overset{|}{C}H}SO_2CH=CH_2$$

$$C_2H_5OCH_2CH_2COCH=CH_2$$
$$CH_3OCH_2CH_2COCH=CH_2$$

$$HOCH_2CH_2SO_2CH_2CH_2\underset{Cl}{\overset{|}{N}}C_5H_5$$

$$CH_3OCH_2CH_2SO_2CH_2CH_2N\begin{matrix}\diagup CH_2 \\ \diagdown CH_2\end{matrix}$$

$$CH_3OCH_2CH_2SO_2CH_2CH_2N\begin{matrix}\diagup CHCH_3 \\ \diagdown CH_2\end{matrix}$$

$$CH_3OCH_2CH_2CON\begin{matrix}\diagup CH_2 \\ \diagdown CH_2\end{matrix}$$

$$CH_3OCH_2CH_2COHNCH_2NHCOCH=CH_2$$

$$CH_3OCH_2CH_2CON\begin{matrix}\diagup CH_2CH_2 \\ \diagdown CH_2CH_2\end{matrix}N-COCH_2CH_2N\begin{matrix}\diagup CH_2 \\ \diagdown CH_2\end{matrix}$$

$$CH_3OCH_2CH_2SO_2NHCH_2CH_2NHSO_2CH=CH_2$$
$$CH_3OCH_2CH_2COCH_2COCH=CH_2$$
$$CH_3COOCH_2CH_2SO_2CH=CH_2$$

$$CH_3OCH_2CH_2\overset{O}{\underset{\|}{S}}CH_2CH_2N\begin{matrix}\diagup CH_2 \\ \diagdown CH_2\end{matrix}$$

$$CH_3OCH_2CH_2CSNHCH_2NHCSCH=CH_2$$
$$CH_3OCH_2CH_2SO_2CH_2C_6H_4CH_2SO_2CH=CH_2$$
$$C_2H_5OCH_2CH_2SO_2CH_2CH_2CH_2SO_3CH=CH_2$$

$$CH_3OCH_2CH_2SO_2\underset{CH_3}{\overset{|}{C}}=CH_2$$

$$CH_3OCH_2CH_2SO_2\underset{CH_3}{\overset{|}{C}HCH_2}SSO_3Na$$

$$HOCH_2CH_2SO_2CH=CH_2$$
$$CH_3OCH_2CH_2SO_2CH_2CH_2OSO_3Na$$

$$CH_3OCH_2CH_2\overset{+}{\underset{C_2H_5}{S}}CH_2CH_2OSO_3-$$

$$C_2H_5OCH_2CH_2CON\begin{matrix}\diagup CH_2-CH_2 \\ \diagdown CH_2-CH_2\end{matrix}N-COCH=CH_2$$

$$CH_3OCH_2CH_2CONHNHCOCH=CH_2$$

$$CH_3OCH_2CH_2CON\underset{CH_3}{\overset{|}{\phantom{N}}}-N\underset{CH_3}{\overset{|}{\phantom{N}}}COCH=CH_2$$

$$C_2H_5OCH_2\underset{CH_3}{\overset{|}{C}H}CONHSO_2CH=CH_2$$

$$CH_3OCH_2CH_2SO_2NHCOCH=CH_2$$
$$CH_3OCH_2CH_2SOCH=CH_2$$

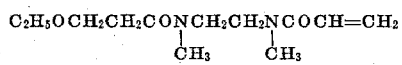

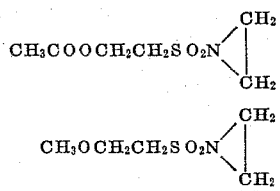

Other compounds, particularly those wherein Z is any one of a large number of alkylenes, aralkylenes, and diamine residues, will be apparent to those skilled in the art as being satisfactory cross-linking agents for the process of the invention.

It has been further found that a polymeric material having active hydrogen atoms, such as a cellulosic material, can also be modified by treating it with the new and novel sulfone and sulfonamide compounds of the invention having the formula

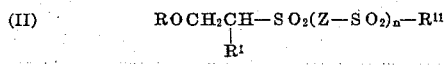

wherein R, $R^1$ and $R^{11}$, Z and n have the same definitions as in Formula (I).

Furthermore, excellent results have been obtained with new and novel sulfone compounds having the formula

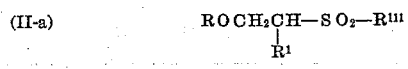

wherein R and $R^1$ have the same definition as above and $R^{111}$ is a member selected from the group consisting of $-CH=CH_2$ and $-CH_2CH_2A$ wherein A is a member selected from the group consisting of a polar residue derived from a reagent of weak nucleophilic character and an aziridinyl group having the formula

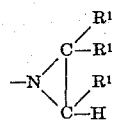

where $R^1$ has the same definition as above.

Best results occur when the lower akyl groups referred to in the aforesaid formulas I and II, or which form a part of the lower acyl group, contain 1 – 6 carbon atoms and, preferably, when they contain from 1 – 4 carbon atoms.

Among the polar residues (A) which can be present in the compounds represented by the formulas (I) and (II) as well as (II-a) are groups derived from reagents of weak nucleophilic character. More specifically, the polar residues are selected from the group consisting of the anion of a strong acid (ionization constant $> 10^{-5}$) and the cation of a weak base (ionization constant $-1-0^{-5}$).

Specific examples of A are the following: When A is the anion of a strong acid:

- $-OSO_3M$ sulfate residue, where M is selected from the group consisting of alkali and ammonium
- $-SSO_3M$ thiosulfate residue, where M has the same meaning as above
- $-OCOCH_3$ acetate residue, and the like.

When A is the cation of a weak base:

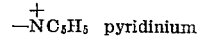

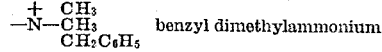

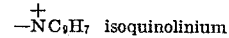

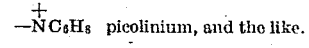

Nucleophilic character is defined as the tendency to donate electrons or share them with a foreign atomic nucleus. (Gilman, "Organic Chemistry," Second Edition, Vol II, p. 1859.)

The reaction of the new unsymmetrical compounds with cellulosic fibers is significant since processes for cross-linking the cellulose molecules impart many highly desirable properties to textile materials manufactured from cellulosic fibers. The present invention will be illustrated by the reaction of the unsymmetrical sulfones of the above formulas with cellulosic materials, including cotton fabrics and regenerated cellulosic fabrics, and cellulose acetate (containing residual hydroxy groups) although it must be understood that the compounds of generic formula (I) can be used as "stepwise" modifying or cross-linking agents for all polymeric materials containing a plurality of active hydrogen atoms per polymeric molecule, both cellulosic and non-cellulosic, which polymeric materials include natural fibrous polymers such as cellulose, wool, silk, and the like; synthetic fibrous polymers such as polyamides, polyvinyl alcohol fibers, and the like; natural non-fibrous materials such as starch, gelatin, and the like; and synthetic non-fibrous polymers such as polyvinyl alcohol resin, polypeptides, and the like. It is to be further understood that the aforesaid polymeric materials having active hydrogen atoms may be reacted at any stage of their development — including as solutions, as fibers, as yarns, as textile fabrics and the like — with one of the functional groups of the modifying agent, and subsequently, at another stage of development, the treated polymeric material is reacted under conditions such that another different functional group of the modifying agent reacts with the polymeric maaterial so as to effect a cross-linking of the polymers and the formation of a three-dimensional network of polymers joined or cross-linked by the modifying agent. Thus, the unsymmetrical polyfunctional modifying agent can be attached by one of the functional groups to the polymeric material in fiber form and, after the fiber has been converted to yarns and subsequently to a fabric, the fabric may be subjected to the proper reaction conditions which permit the other functional group on the modifying agent to react with an active hydrogen on the fabric polymer and effect cross-linking, thus modifying the properties of the fabric. As is apparent from the above, it is necessary that the material being treated include polymers having active hydrogen atoms and thus the process of the invention is also applicable to blends of polymeric materials containing the active hydrogen atoms with materials having no active hydrogens, including fabrics made from a blend of two or more fibrous polymers.

As further illustrative of the invention, the difunctional compounds of Formula I can be reacted with an active hydrogen containing polymeric material such as viscose solutions or cellulose acetate solutions (containing residual hydroxyl groups) prior to converting the polymer into the fiber form. At this point one of the functional groups of the compounds of Formula I reacts and is linked to the active hydrogen of the polymer. The polymer solution is then spun by conventional means into the fiber and the cross-linking reaction may be completed on the fiber, yarn or after weaving the fabric by curing.

The process of this invention can also be carried out to introduce permanent creases or pleats in finished garments. By carrying out the cross-linking reaction with the compounds of Formula I in a stepwise manner it is possible to attach the reactant to the fiber, yarn or fabric by stable chemical bonds at an early stage of processing. Then after the fabric has been made up into the finished garment, permanent creases and pleats can be introduced by completing the cross-linking reaction on the finished garment creased, pleated or otherwise shaped in the desired configuration. The final cross-linking reaction can be carried out by the tailor or retail shop by simple means such as heating or pressing.

The reactants and processes of the invention can be used to obtain twisted or false-twisted cellulosic yarns by carrying out the first step of a cross-linking reaction employing the compounds of Formula I at any desired stage, and completing the crosslinking while the yarn is in a super-twisted state. The first step of the modification, namely reaction of one reactive functional group with the molecules of the fiber or yarn, can be carried out at the most convenient stage of manufacture. Thereafter the second functional group can be reacted in a simple manner in order to set the super-twisted configuration after appropriate mechanical treatment. After the cross-linking reaction is completed, the yarn may be subjected to a detwisting operation whereby a permanently texturized yarn is obtained.

A further application for the reactant and processes of this invention is in the preparation of reaction pigment binders and sizing compounds. By means of the compounds of Formula I it is possible to introduce side chains into such soluble polymeric materials as starch, polyvinyl alcohol and the like without affecting their solubility properties. The modified polymer can then be applied to various textiles, cellulosics and noncellulosic in nature, which are thereafter subjected to a curing reaction whereby the reactants are cured in situ to achieve insolubilization of the polymeric materials. When such reactive sizes are applied to non-cellulosic fabrics the insolubilization takes place by cross-linking of the polymer itself. In the case of treatment of cellulosic fabrics, a chemical reaction producing the cross-linking can also take place between the modified polymer and the textile itself.

Included among the novel compounds of Formula I are those having the formula (III a)          ROCH₂CH—SO₂CH=CH₂
                        |
                        R¹ in which R is selected from the group consisting of hydrogen, lower alkyl and lower acyl, and R¹ is selected from the group consisting of hydrogen and lower alkyl; and

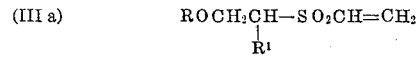

in which R and R¹ have the same definition as shown above and A is selected from the group consisting of a polar residue derived from a reagent of weak nuelcophilic character, such as the cation of a weak base (e.g. -NC₅H₅, pyridinium) or the anion of a strong acid (e.g., -SSO₃Na, thiosulfate; -OSO₃Na, sulfate) as described above.

The compounds shown in Formulas IIIa and IVa are characterized by the presence of the beta-oxyothyl sulfone grouping which is capable of entering into reaction with active hydrogen atoms only under essentially anhydrous conditions and at elevated temperatures. They are further characterized by the presence of the vinyl sulfone grouping (Formula IIIa) and the corresponding saturated derivative grouping ACH₂CH₂SO₂- (Formula IVa) which are capable of entering into reaction with active hydrogen atoms in the presence of water and at ambient temperature. These new compounds can be attached to polymers containing active hydrogen atoms, as shown in the following equations wherein the symbol Pol-H is used to designate a polymer molecule containing a plurality of active hydrogen atoms.

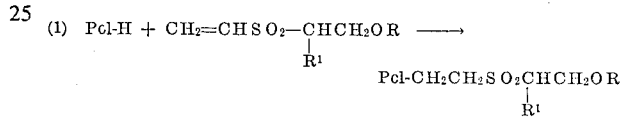

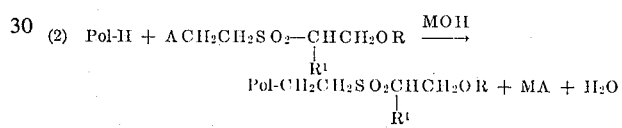

In the second reaction, MOH represents an alkali metal hydroxide, such as sodium hydroxide or a basic compound of equivalent strength.

The reactions illustrated by the foregoing equations can be carried out at ambient temperature in the presence of water under conditions which do not remove or affect the betaoxyethyl sulfone grouping. Such polymeric reaction products can be converted to end products which can be cross-linked at any desired stage of processing by effecting reaction of the betaoxyethyl sulfone with unreacted polymer molecules as shown in the following equation:

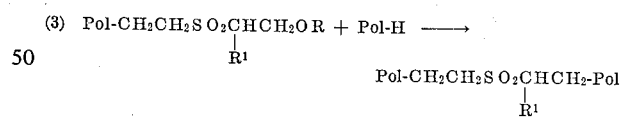

The foregoing reaction takes place when the polymeric product is heated to a temperature of about 100°C. in the presence of a suitable catalyst. Thus, as will be readily apparent, cross-linking of polymeric chains can be carried out on the modified polymer at any desired time.

The compounds corresponding to Formulas IIIa and IVa in which R and R¹ are hydrogen can be prepared by the following reactions:

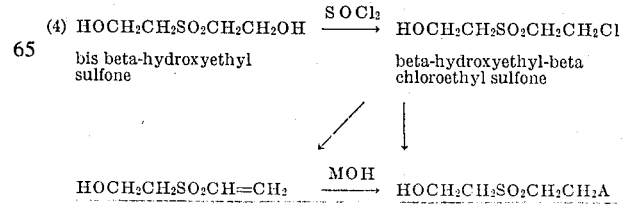

(IV a)          ROCH₂CH—SO₂CH₂CH₂A
                       |
                       R¹

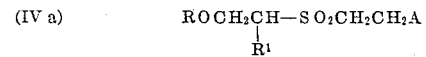

A represents the residue derived from a reagent of weak nucleophilic character, MOH is preferably an alkali metal hydroxide, but any alkaline compound having a dissociation constant greater than about $10^{-5}$ will be satisfactory in the aforesaid reaction.

As is evident from the foregoing equation, the bis-beta-hydroxyethyl sulfone in the presence of $SOCl_2$ is converted to beta-hydroxyethyl-beta' chloroethyl sulfone. When the latter compound is reacted with a suitable reagent such as an ankali metal thiosulfate, the following compound is formed:

(V)  $HOCH_2CH_2SO_2CH_2CH_2SSO_3Na$

When the beta-hydroxyethyl-beta' chloroethyl sulfone is reacted with pyridine, it forms a pyridinium chloride derivative, having the following formula:

(VI) 

Likewise, the beta-hydroxyethyl-beta' chloroethyl sulfone can be reacted with other compounds to convert it to other saturated derivatives of polar character.

The compounds corresponding to Formulas IIIa and IVa in which R is a lower alkyl or lower acyl group and $R^1$ is hydrogen or lower alkyl, can be prepared by the following reactions:

The cross-linking reaction of the unsymmetrical difunctional compounds, such as those of Formulas IIIa and IVa, with polymeric materials, and more particularly with cellulose, can be carried out in two distinct and completely controllable steps. In the first step, the group $-SO_2CH=CH_2$ or, alternatively, $-SO_2CH_2CH_2A$, is reacted at ambient temperatures in the presence of an aqueous alkali to form a side chain on the polymer. In the case of cellulose, some cellulose molecules are converted to a cellulose ether having the formula

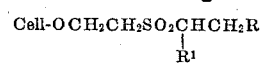

This other can then be reacted with another cellulose molecule in a separate step to form a cross-linked product as shown by the following equation:

(6a)
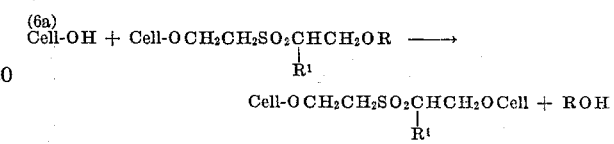

The foregoing reaction can be carried out at temperatures of about 100°C. or higher in the presence of a mild alkaline catalyst under conditions which allow the removal of the byproduct molecule ROH by evapora- (5a)
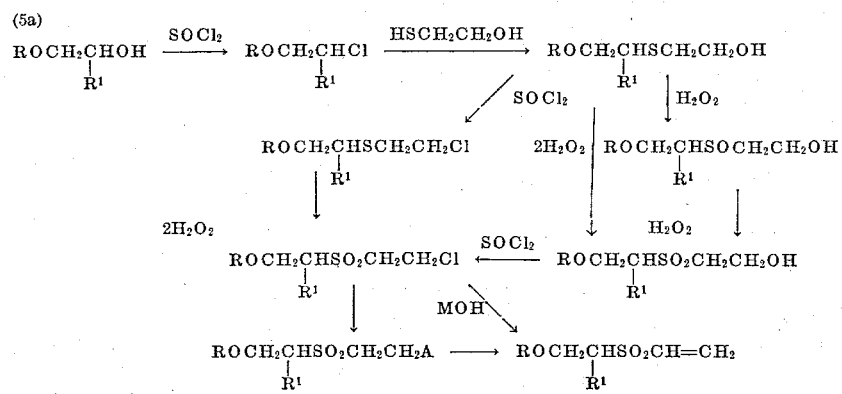

It is also possible to convert the β hydroxyethyl, β-alkoxyethyl sulfoxide or sulfone shown above to the corresponding sulfated products by employing sulfating agents such as sulfamic acid, chlorosulfonic acid, or sulfur trioxide as shown in equations (5 b) and (5 c) below, where M represents the cation of the base employed in the neutralization of the sulfuric acid ester.

(5b)
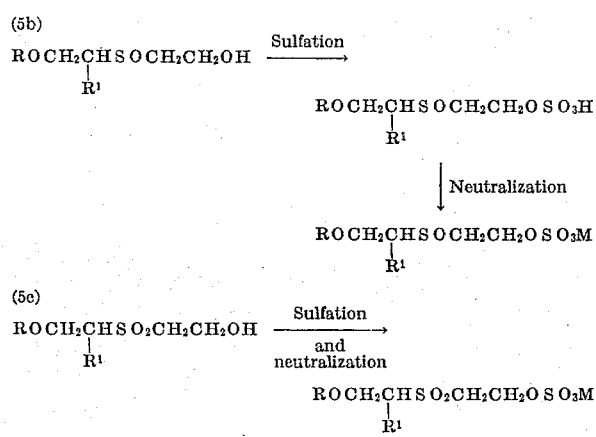

(5c)
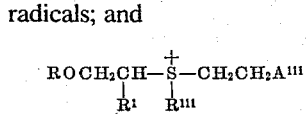

tion (when R is either hydrogen or lower alkyl) or by neutralization (when R is acyl).

Further included among the novel compounds of Formula I are sulfonium compounds having the formula:

(IIIb)

$$ROCH_2CH - \overset{+}{\underset{R^{111}}{S}} - CH = CH_2$$
$$\phantom{ROCH_2CH-}\underset{R^1}{|}$$

in which R and $R^1$ have the same meaning as previously defined above, and $R^{111}$ is a member selected from the group consisting of substituted and unsubstituted alkyl and aralkyl radicals; and (IVb)

$$ROCH_2CH - \overset{+}{\underset{R^{111}}{S}} - CH_2CH_2A^{111}$$
$$\phantom{ROCH_2CH-}\underset{R^1}{|}$$

in which R and $R^1$ have the same meaning as previously defined above, $R^{111}$ has the same meaning as in Formula IIIb above, and $A^{111}$ is selected from the group consisting of a polar residue derived from a reagent of weak nucleophilic character. Some of the compounds shown in formulae IIIb and IV b can be prepared for example by the following sequences of reactions

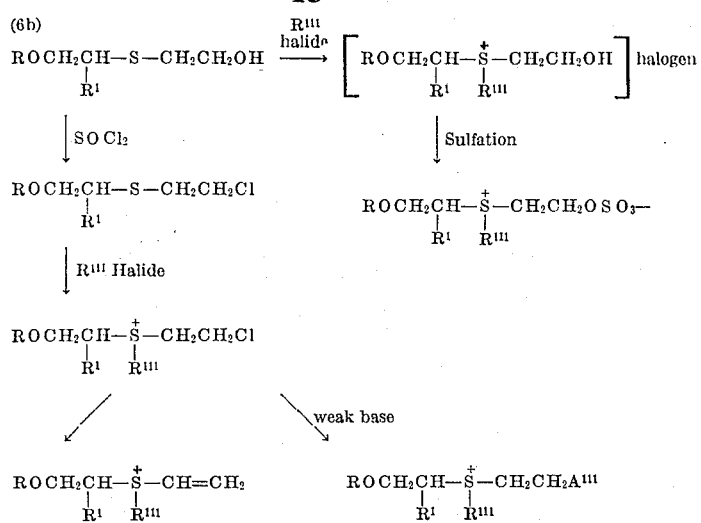

(6b)

$ROCH_2CH(R^1)-S-CH_2CH_2OH \xrightarrow{R^{111} \text{ halide}} [ROCH_2CH(R^1)-\overset{+}{S}(R^{111})-CH_2CH_2OH]$ halogen $\downarrow SOCl_2$      $\downarrow$ Sulfation $ROCH_2CH(R^1)-S-CH_2CH_2Cl$     $ROCH_2CH(R^1)-\overset{+}{S}(R^{111})-CH_2CH_2OSO_3^-$ $\downarrow R^{111}$ Halide $ROCH_2CH(R^1)-\overset{+}{S}(R^{111})-CH_2CH_2Cl$ ↙      ↘ weak base $ROCH_2CH(R^1)-\overset{+}{S}(R^{111})-CH=CH_2$     $ROCH_2CH(R^1)-\overset{+}{S}(R^{111})-CH_2CH_2A^{111}$ Examples of suitable "R¹¹¹" groupings in the unsymmetrical sulfonium compounds of formulae (IIIb) and (IVb) above are the following:

Methyl, ethyl, propyl, butyl and generally unsubstituted alkyl;

Cyanoethyl, alkoxy alkyl and generally alkyl groups containing inert substituents;

Benzyl, methyl benzyl, phenyl ethyl, and generally aralkyl groups which are unsubstituted or contain inert substituents.

When the unsymmetrical sulfonium compounds shown in formulae (III b) and (IV b) are reacted with a polymer containing active hydrogen (e.g. cellulose) in presence of an alkaline catalyst, a side chain is formed. Depending on reaction conditions, the group $R^{111}$ may remain attached to the sulfur atom or be removed to form a thioether chain. The following equation illustrates the reaction employing cellulose as the polymeric material.

(6c) $CellOH + ROCH_2CH(R^1)-S(R^{111})-CH=CH_2 \longrightarrow$

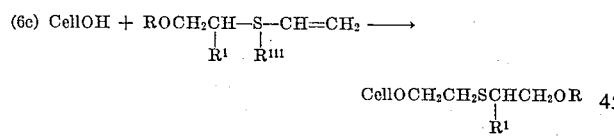

$CellOCH_2CH_2SCH(R^1)CH_2OR$

The thioether linkage is not a strong activating group, and before completing the cross-linking reaction it is preferable to increase the reactivity of the modified polymer by oxidizing the thioether side chain to be corresponding sulfoxide or sulfone. This can be easily accomplished with common oxidizing agents such as hydrogen peroxide, as shown in the following equation (6d) $CellOCH_2CH_2SCH(R^1)CH_2OR \xrightarrow{[O]} CellOCH_2CH_2SOCH(R^1)CH_2OR$ $\xrightarrow{[O]} CellOCH_2CH_2SO_2CH(R^1)CH_2OR$

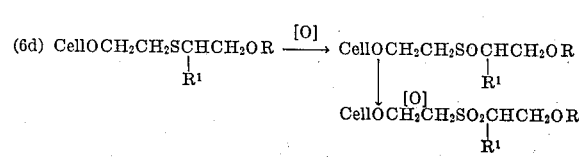

The sulfoxide or sulfone reaction product can be readily cross-linked in presence of an alkaline catalyst at elevated temperature as previously shown in equation (6a) above.

Also included among the novel compounds of the invention are the following:

(VII) $ROCH_2CHSO_2CH_2CH_2N\begin{pmatrix}C(R^1)(R^1) \\ C(R^1)(H)\end{pmatrix}$

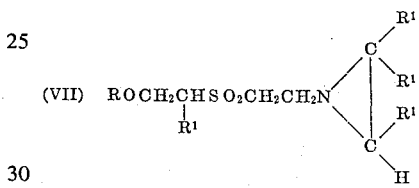

in which R is selected from the group consisting of hydrogen, lower alkyl and lower acyl, $R^1$ is a member selected from the group consisting of hydrogen and lower alkyl. The compounds of formula VII can be prepared either from the compounds of formula IIIa by addition of a three-membered heterocyclic imino compound as shown by way of example in equation (7a), (7a) $ROCH_2CH_2SO_2CH=CH_2 + HN\begin{pmatrix}CH_2 \\ CH_2\end{pmatrix} \longrightarrow$ $ROCH_2CH_2SO_2CH_2CH_2N\begin{pmatrix}CH_2 \\ CH_2\end{pmatrix}$, or

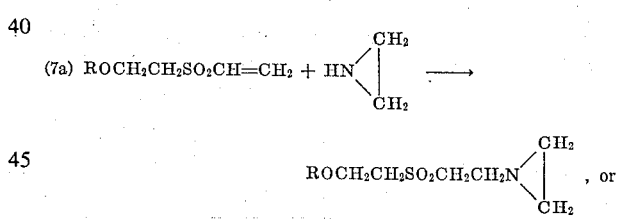

they can also be prepared by reacting the corresponding betahaloethyl sulfonyl compounds with three-membered heterocyclic imino compounds under suitable reaction conditions.

Further compounds included in generic formula (I) are those corresponding to formula (VIII) below.

(VIII) $ROCH_2CH_2CONHCH_2NHCOCH=CH_2$ which can be obtained for example simply by the addition of one mole of alcohol to one mole of the symmetrical unsaturated compound N,N methylene bis acrylamide, and related compounds prepared in similar manner from bis acrylamides and bis vinyl sulfonamides of other bis secondary and bis primary amides.

Other unsymmetrical compounds included in generic formula (I) can be obtained by suitable preparative methods. For example, a compound containing two —NH— groups (e.g. hydrazine, aliphatic diamines, heterocyclic diamines and the like) can be acylated with two different reactants as shown in the following equations, in which Y, R and $R^1$ have the same meaning previously defined above and b can be 1 or zero.

(7b)
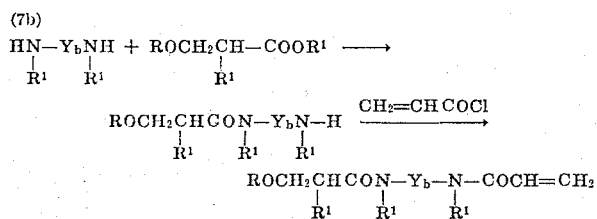

Similar reactions are employed when the compound containing the two —NH— groups is a heterocyclic compound

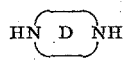

in which the two nitrogen atoms are part of the heterocyclic ring D.

Still another class of unsymmetrical reactants can be prepared by acylation of amides, as shown for example in the following equations:

(7c)
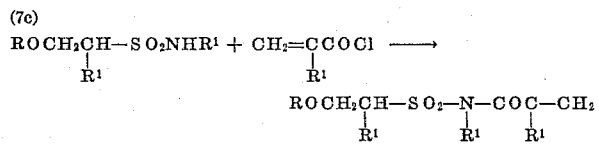

wherein R and $R^1$ have the same meaning as previously defined above.

Also included are unsymmetrical ketones such as those shown in formulas (IX) and (IXa) below.

(IX) $ROCH_2CH_2COCH_2COCH=CH_2$ (IXa) $ROCH_2CH_2COCH_2COCH_2CH_2A$ in which R and A have the meaning specified previously. The unsymmetrical ketones of formulas (IX) and (IXa) can be prepared for example as shown in equation (8).

(8)

The unsaturated compounds shown in the foregoing formulae and as reaction products in the foregoing equations can be converted to other new and useful unsymmetrical cross-linking agents by a reaction with three-membered heterocyclic imino compounds analogous to the reaction shown in equation (7a) for the unsymmetrical sulfone compounds.

Included among the compounds of generic formula (I) are also unsymmetrical aziridinyl compounds corresponding to formulas (X) and (X-a)

(X)
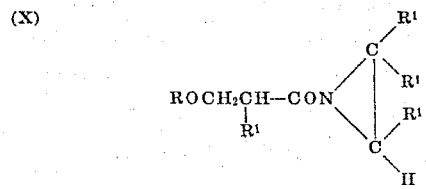

(X-a)
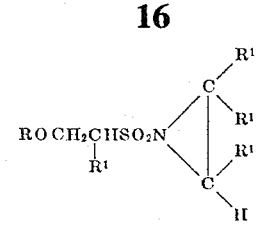

and prepared by reacting the cyclic imine with the appropriate acid halide as shown in equations (9) and (10) (for the chloride) in the presence of a suitable acid acceptor.

(9)
(10)
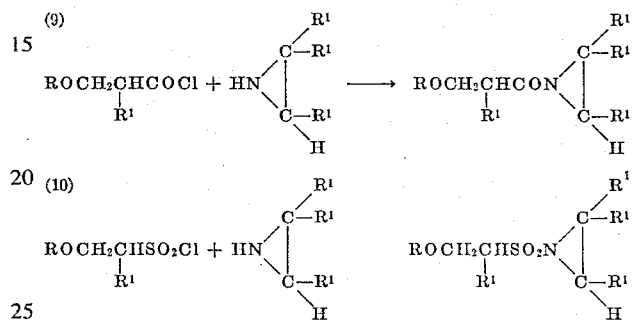

It is apparent from the above discussion that a large number of unsymmetrical reagents coming within the scope of the generic formula (I) are included in the scope of the present invention. For some compounds, for example those in which the grouping $R^{11}$ is

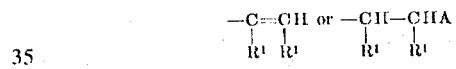

where A is the residue of a weak nucleophile, the two steps of the cross-linking process are both carried out under alkaline conditions, the first functional group being reacted in presence of water and second being reacted at elevated temperature by baking or steaming. For other compounds, for example those in which the grouping $R^{11}$ is

where A is aziridinyl

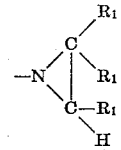

or those in which the grouping $R^{11}$ is aziridinyl the two steps of the cross-linking process are both carried out at elevated temperature, but one functional group is reacted under alkaline conditions, while the second is reacted under acidic conditions.

Thus, the processing conditions required to carry out the stepwise cross-linking employing the unsymmetrical reagents of the present invention depend on the chemical structure of the reagent selected.

The following examples are merely illustrative of the features of the invention, but are not to be considered limiting in any manner with respect to the scope of the invention.

EXAMPLE 1

Preparation of 2 chloroethyl 2'hydroxyethyl sulfone.

154 grams (1 mol) of anhydrous bis-(2-hydroxyethyl) sulfone were dissolved in 500 g. of dimethyl ether of ethylene glycol and 79 g. (1 mol) of pyridine were added thereto. 95 g. (0.8 mol) of thionyl chloride were then added with stirring and cooling. The temperature was maintained at 40°–45°C. and the addition took 50 minutes. The mixture was then refluxed for 30 minutes at 82°–85°C.

The reaction mixture was poured into water, and the organic phase was separated. The organic phase was then dried over $Na_2SO_4$ and the solvent was removed by distillation, leaving 66 grams of crude product in the form of a brown liquid.

| Analysis: | Total chloride: | 17.7% | (determined by hydrolysis) |
|---|---|---|---|
| | Free chloride: | 2.48% | (determined by $AgNO_3$ titration) |
| | Bound chloride: | 15.22% | (by difference) |
| | Calcd. chloride: | 20.70% | |
| | Purity of crude product: | 74% | |

Although higher yields of product could be obtained by increasing the mol ratio of $SOCl_2$ to bis-(2 hydroxyethyl) sulfone, this resulted in contamination of the product by bis(2-chloroethyl) sulfone, which was separated with great difficulty. The product prepared by the procedure outlined in Example 1 on the other hand, was contaminated only by unreacted bis (2 hydroxyethyl) sulfone which was readily removed in subsequent steps.

EXAMPLE 2

Preparation of 2 hydroxyethyl sulfonyl ethyl pyridinium chloride

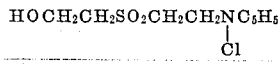

69 grams (0.4 mol) of 2 chloroethyl 2'hydroxyethyl sulfone, 32 grams (0.4 mol) of pyridine, and 150 grams of isopropanol were refluxed with stirring at 88°–92°C. for 12 hours. A tan solid precipitated in the course of reaction, indicating that essentially all of the organic chloride which was present was converted to ionic chloride. The solvent layer was decanted, and the precipitate was washed with acetone and ether on a filter. 61 grams of light tan crystalline product were obtained.

| Analysis: | Chloride found: | 14.25% (By $AgNO_3$ titration) |
|---|---|---|
| | Calcd. chloride: | 14.10% |
| Equivalent weight: found — 248 | | |
| calcd.— 251.5 | | |

The equivalent weight was determined by electrometric titration with standard NaOH solution (end pt: pH 10.5).

EXAMPLE 3

Preparation of 2 methoxyethyl chloride.

190 grams (2.5 mol) of 2 methoxyethanol and 216 grams (2.75 mols) of pyridine were diluted with 100 grams of ethylene glycol dimethyl ether. 327.8 grams (2.75 mols) of thionyl chloride were then added with stirring over a period of 2 hours. The temperature was maintained below 50°C. by means of a cooling bath. After addition of the $SOCl_2$ the mixture was heated to reflux and stirred at 80°–85°C. for 30 minutes. The reaction mixture was poured on to 1000 g. of crushed ice and the water layer was separated. The organic layer was washed twice with 100 ml. of cold water, dried over $Na_2SO_4$ and distilled. Bp. 85°–90°C. (at atmospheric pressure).

| Analysis: | Bound chloride: | 36.9% |
|---|---|---|
| | Calcd. chloride: | 37.5% |
| | Purity: | 98.5% |

The distilate weighed 214 grams, corresponding to a yield of 89.5% of the theoretical.

EXAMPLE 4

Preparation of 2 methoxyethyl 2' hydroxyethyl sulfide.

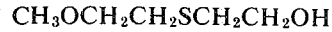

273 grams (3.5 mols) of 2-mercaptoethanol were added to 140 grams (3.5 mols) of sodium hydroxide dissolved in 300 grams of ethanol. 331 grams (3.5 mols) of 2 methoxyethyl chloride were added dropwise with stirring under a blanket of nitrogen over a period of 5 hours. The temperature was kept below 40°C. After the addition was completed, the mixture was stirred an additional 3 hours. The precipitated sodium chloride was filtered off, and ethanol and water were removed by stripping under reduced pressure. The product was then distilled. Bp: 104°–107°C. at 6 mm. The distillate was a colorless liquid.

Analysis: percent sulfur found: 23.2 percent; calcd. 23.5 percent The distillate obtained weighed 381 grams, corresponding to a yield of 80 percent of the theoretical.

EXAMPLE 5

Preparation of 2 methoxyethyl 2' hydroxyethyl sulfone.

200 grams (1.47 mols) of 2 methoxyethyl-2'hydroxyethyl sulfide (product of example 4) were charged in a reaction vessel, and 2 grams of 85 percent phosphoric acid were added. 137 grams (1.41 mols) of 35 percent aqueous hydrogen peroxide were added dropwise with stirring over a period of 90 minutes and the temperature was maintained below 55°C. by means of a cooling bath. The mixture was then heated to reflux, and another portion of 137 grams of 35 percent hydrogen peroxide was added over a period of 60 minutes at 100°–107°C. The mixture was then refluxed for 12 hours or until a test for residual hydrogen peroxide was negative. The water was removed under reduced pressure at 17 mm to a pot temperature of 105°C.

The product was obtained as a light yellow liquid which weighed 200 grams and contained only a very small amount of oxidizable sulfur (0.25 percent). The yield was 81.5 percent of the theoretical.

EXAMPLE 6

Preparation of 2 methoxyethyl 2′chloroethyl sulfone.

$$CH_3OCH_2CH_2SO_2CH_2CH_2Cl$$

50.4 grams (0.3 mol) of 2 methoxyethyl 2′hydroxyethyl sulfone (product of example 5) were dissolved in 26 grams (0.33 mol) of pyridine, and 39.3 grams (0.33 mol) of thionyl chloride were added dropwise while stirring, over a period of 60 minutes at a temperature not exceeding 40°CC. The mixture was heated to 70°C. and kept at 70°C. for 30 minutes. After cooling to room temperature, the reaction mixture was poured on to a saturated sodium chloride solution (in water), and extracted with dimethyl ether of ethylene glycol three times using 100 ml. of the ether for each extraction. After separating and drying the organic phase, the solvent was removed under reduced pressure, and the residue was distilled. Bp: 131°–132° at 10 mm. The product was a pale yellow liquid obtained in 40 percent yield.

Analysis: Bound chloride: found — 18.9%
calcd. — 19.05%
Methoxyl content: found — 16.65
calcd. — 16.62

EXAMPLE 7

Preparation of 2 methoxyethyl sulfonyl ethyl pyridinium chloride $$CH_3OCH_2CH_2SO_2CH_2CH_2NC_5H_5$$

200 grams (1.07 mols) of 2 methoxyethyl-2′chloroethyl sulfone (product of example 6) were mixed with 250 grams of isopropanol and 85 grams (1.07 mols) of pyridine, and refluxed for 6 hours at 80°–90°C., at which time essentially all of the organic chloride present was converted to ionic chloride. The isopropanol was removed under reduced pressure, and the crystalline residue was washed with acetone and ether on a filter.

The weight of the white crystalline product so obtained was 262.8 grams, corresponding to a yield of 91% of the theoretical.

Analysis: Chloride content: found — 12.2%
calcd. — 13.3%
Equivalent weight: found — 288
calcd. — 266.5

The equivalent weight was determined by electrometric titration with a standard NaOH solution.

EXAMPLE 8

Preparation of 2 methoxyethyl, 2′thiosulfatoethyl sulfone.

$$CH_3OCH_2CH_2SO_2CH_2CH_2SSO_3Na$$

93.2 grams (0.5 mol) of 2 methoxyethyl 2′chloroethyl sulfone (product of example 6) were mixed with 93 grams of ethanol, and a solution of 124 grams (0.5 mol) of sodium thiosulfate pentahydrate in 124 grams of water was added. The mixture so obtained was refluxed with stirring for 4 hours, until essentially all of the organic chloride was converted to ionic chloride. The reflux temperature of the mixture was 80°–90°C. After the refluxing, 100 percent conversion was achieved, as indicated by titration for free thiosulfate ion. The reaction product was not isolated in crystalline form, but the ethanol was distilled off and the residual aqueous solution was analyzed as follows:

Calculated concentration of product from the weight of aqueous solution obtained: 42.8 percent.

Concentration determined from the amount of sodium hydroxide consumed in alkaline hydrolysis: 43.1 percent.

Concentration determined from the amount of sodium thiosulfate liberated in alkaline hydrolysis with sodium hydroxide: 39.9 percent.

EXAMPLE 9

Preparation of 2 methoxyethyl vinyl sulfone.

$$CH_3OCH_2CH_2SO_2CH=CH_2$$

46.6 grams (0.25 mol) of 2 methoxyethyl 2′chloroethyl sulfone (product of example 6) were added dropwise with continuous stirring to a solution containing 26.0 grams (0.25 mol) of triethylamine and 100 grams of ethylene glycol dimethyl ether. External cooling was necessary in order to maintain the temperature at 25°–30°C. The addition required 40 minutes. An additional hour of stirring at room temperature was necessary to reach 80 percent conversion after the addition of the chloride was completed. The triethylamine hydrochloride which precipitated was filtered off and the solvent was removed under reduced pressure. The residue was vacuum distilled. Bp: 96°–98°C. at 1 mm. Yield of distilled product: 29.0 g. corresponding to 77.5 percent of the theoretical. $n_D^{20} = 1.4659$. Vinyl content: 17.85 percent (calcd.: 18.0 percent).

EXAMPLE 10

Preparation of 2 hydroxyethyl vinyl sulfone.

$$HOCH_2CH_2SO_2CH=CH_2$$

125.0 grams (1.23 mols) of triethylamine were added dropwise with continuous stirring to a solution containing 172.5 grams (1.0 mol) of 2 chloroethyl 2′hydroxyethyl sulfone (product of example 1) in 500 grams of dioxane. External cooling was necessary in order to maintain the temperature at 30°–35°C. The addition required 60 minutes. An additional hour of stirring at room temperature was necessary to reach 95 percent conversion after the addition of triethylamine was completed. The pH of the reaction mixture was adjusted to 6.8 by adding glacial acetic acid. Then the triethylamine hydrochloride which precipitated was filtered off and the solvent was removed from the filtrate under reduced pressure. The residue was vacuum distilled. The product was collected as a fraction of b.p. 114°–119°C at 0.3 mm. The yield of distilled product was 50.5 grams corresponding to 37.2% of the theoretical. $n_D^{20} = 1.5005$. Vinyl content 17.4 percent (calcd.: 19.8 percent).

EXAMPLE 11

Preparation of the Na salt of 2 methoxyethyl sulfonylethyl sulfate

$CH_3OCH_2CH_2SO_2CH_2CH_2OSO_3Na$ (A) Preparation of the ammonium salt 168 grams (1 mol) of 2 methoxyethyl 2' hydroxyethyl sulfone (product of example 5), 101 grams (1 mol + 5 percent excess) of sulfamic acid and 17 grams of urea were charged in a reaction vessel. The mixture was heated to 100°–110°C.: when the reaction became exothermic, the source of external heat was removed and the temperature was maintained between 115°–125°C. by cooling as needed. When the reaction ceased to be exothermic the temperature was maintained between 120°–125°C. with external heating for 60 minutes.

The crude product obtained was dispersed in ether and filtered. After filtration and drying 237.5 grams of white crystalline product were obtained. Yield: 89.5 percent. M.p. 96°–99°C. Equivalent weight determined by non aqueous electrometic titration with standard alcoholic Na methylate solution: 292 (calcd.: 265).

B. Preparation of the Na salt 237 grams (0.9 mol) of 2 methoxyethyl sulfonylethyl ammonium sulfate (product of example 11 A) were dissolved in 500 grams of distilled water and the solution was allowed to pass through an ion exchange column which contained 1,500 ml. wet Amberlite IR-120H resin*. The column was washed with an additional 500 ml. of distilled water. A sample of the combined solutions obtained (which weighed 1158 grams) was titrated with standard NaOh solution. Conversion to free acid was 100 percent. The entire solution was then neutralized with 48.0 grams of anhydrous $Na_2CO_3$ to pH 5.8.

\* Product of the Rohm and Haas Chemical Co.

The concentration of the solution was determined by the consumption of NaOH of the reagent and found to be 18.2 percent (equivalent to a 92.5 percent yield).

A crystalline product could be isolated from the solution by stripping and triturating with acetone. M.p. 74°–80°C. Eq. wt. 290 (calcd. 270).

EXAMPLE 12

Preparation of 2 methoxyethyl 2' azirodino ethyl sulfone.

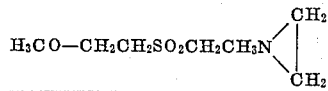

29.0 grams (0.19 mol) of 2 methoxyethyl vinyl sulfone (product of example 9) were added to 13.2 grams (0.3 mol) of ethylene imine keeping the temperature at 29°–30°C. by cooling with an ice bath. The time of the addition was 25 minutes, and stirring for 60 minutes at room temperature after completing the addition was sufficient to achieve complete reaction. The excess ethylene imine was distilled off and the residual yellow liquid weighed 35.1 grams. The equivalent weight determined by titration with standard acid was 208 (calcd.: 193). The equivalent weight determined by thiosulfate titration (described in JACS 77, 5918-22 (1955) was 211. The yield of product was 88.6 percent of the theoretical.

EXAMPLE 13

Preparation of 2 methoxypropionamindomethyl acrylamide.

$CH_3OCH_2CH_2COHNCH_2NHCOCH=CH_2$ 42.1 grams of 60 percent aqueous N-methylolacrylamide (0.25 mol) and 14.0 grams of 37 percent aqueous HCl were added dropwise at room temperature to a solution of 51.5 grams of 2-methoxypropionamide (0.5 mol) in 50 grams of water. The mixture was then stirred for 1 hour, and allowed to stand at room temperature overnight. The reaction mixture was then cooled to 5°C. and neutralized to pH 6.0 by the gradual addition of $Na_2CO_3$. The white crystalline precipitate formed was filtered, and twice recrystallized from isopropanol. Mp. 155°–157°C. Vinyl content (determined by dodecyl mercaptan titration) 13.65 percent (calcd. 14.55 percent); methoxyl content 17.05 percent (calcd. 16.65 percent); nitrogen content 15.22 percent (calcd. 15.05 percent). Mixed mp. with methylene bis acrylamide: 98°–110°C. Mixed mp. with methylene bis-methoxypropionamide (mp. 146°–149°C) 125°–135°C.

EXAMPLE 14

(A) Preparation of 2-methoxyethyl 2' hydroxyethyl ethyl sulfonium bromide.

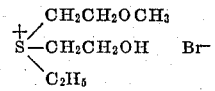

A mixture of 136 grams (1.0 mol) of 2-methoxyethyl 2'-hydroxyethyl sulfide (product of example 4) and of 125 grams (1.0 mol) of 2-bromoethanol was refluxed for 40 hours until the reflux temperature rose to 72°–73°C. 90 percent conversion was achieved. The crude product obtained had a bromide ion content of 29.0 percent (calcd. 30.6 percent).

B. Preparation of the Inner Salt of 2-methoxyethyl-2'ethyl, ethyl sulfonium.

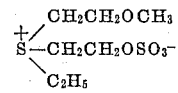

56.0 grams (0.48 mol) of chlorosulfonic acid were added dropwise with continuous stirring to a mixture containing 104 grams (0.40 mol) of 2-methoxyethyl 2'hydroxyethyl ethyl sulfonium bromide (product of example 14 A) and 500 ml. chloroform. During the addition the temperature was maintained between 5°–10°C. by external cooling. The addition required 2 hours. After the addition of chlorosulfonic acid was completed, the reaction mixture was stirred for 3 hours at room temperature. After standing overnight the reaction mixture was poured into 500 grams of crushed ice. The chloroform layer was washed with water and the aqueous extract was combined with the aqueous layer.

The combined aqueous solutions were then neutralized with 50 grams of sodium carbonate. The solution so obtained weighed 827 grams and contained 98 grams of the desired product.

The foregoing are merely illustrative of the processes whereby the new and novel compounds of the invention may be formed. The reaction conditions will vary depending upon the particular compound to be produced. Thus, in Examples 2, 7 and 8 the reaction occurs at a temperature of from 80° to 90°C. in a period of from 4 – 14 hours and the reactants are present in equimolar proportions. In Example 12, on the other hand, the imine is present in excess and the reaction is conducted at low temperatures of 29°–30°C. and then completed at room temperature. Variations in temperature and times will be readily apparent.

Whereas the chlorine derivative is utilized as an intermediate in several of the foregoing examples, it is to be understood that any of the halogen derivatives will operate satisfactorily.

EXAMPLE 15

Reaction of the Inner Salt of 2 methoxyethyl 2'sulfatoethyl ethyl sulfonium with Cotton Cellulose A Samples of 80 × 80 cotton were padded with an 11 percent aqueous solution of the product of example 14B at 100 percent wet pickup to give 0.11 gram of reagent per gram of fabric and dried at 80°–90°C. One sample (I) was then padded with a 3.0 percent aqueous NaOH solution saturated with $Na_2SO_4$ at 96 percent wet pickup giving 0.029 grams of NaOH per gram of fabric. This was equivalent to 1.6 mols of NaOH per mol of reagent. The other sample (II) was padded with a 2.0 percent NaOH solution saturated with $Na_2SO_4$ at 95 percent wet pickup giving 0.019 grams of NaOH per gram of fabric. This was equivalent to 1.01 mols of NaOH per mol of reagent.

Both samples were rolled wet, wrapped in polyethylene sheeting and allowed to stand for 30 min. at room temperature. After this reaction period, the fabrics were rinsed in a 1 percent acetic acid solution, then washed in detergent solution at 60°–70°C rinsed in water, dried and conditioned to determine weight increase.
B The physical properties of the fabrics were determined and the samples were then treated with a 3.0 percent solution hydrogen peroxide solution for 60 min. at room temperature. After drying at 80°C., the samples were treated with a 3.0 percent solution of potassium bicarbonate, dried at 80°–90°C., cured for 3 min. at 160°C, and washed. The change in physical properties resulting from treatments (A) and (B) was as follows:

EXAMPLE 16

Reactions of 2-hydroxyethyl sulfonylethyl pyridinium chloride (product of example 2) with Cotton Fabric. A. A sample of cotton fabric (known as 80 × 80 print cloth) was impregnated with a 25 percent aqueous solution of the product of example 2 on a laboratory padder, setting the rolls at such a pressure as to give a 100 percent wet pickup. 0.25 gram of reagent were thus deposited on each gram of cotton fabric. The impregnated fabric was framed to the original dimensions and dried in a forced draft oven at 80°–90°C., then treated by padding with a 5.5 percent sodium hydroxide solution. The amount of NaOH solution picked up by the fabric was such (76 percent) as to yield a 1.04 mols ratio of NaOH to reagent on the fabric. The fabric was rolled and allowed to stand wet at room temperature for 60 min. care being taken to prevent evaporation of water by covering the roll with polyethylene or other non-porous material. The fabric was rinsed with 1% acetic acid to neutralize residual NaOH, and washed at 60°–70°C. The reaction described yielded a 3.6 percent increase in fabric weight forming the product

$CellOCH_2CH_2SO_2CH_2CH_2OH$.

The sulfur content of the fabric so treated was equivalent to the observed weight increase. The physical properties of the treated cotton fabric (crease recovery, tensile strength, tear strength) were essentially identical with those of the untreated fabric, since in the modification of the fiber only one reactive grouping of the reagent was involved and side chains were introduced without incipient cross-linking or formation of a three-dimensional network. B. The second reactive grouping (beta-oxyethyl-sulfonyl) of the modified cotton product described in example 16(A) could be reacted with the residual unmodified cellulose molecules by the procedure described below. The modified cotton fabric prepared in example 16(A) was impregnated by padding with a 0.5 percent aqueous solution of potassium bicarbonate, dried at 80°–90°C., then cured for 3 minutes at 150°C., washed and dried. The catalyzed heating step efficiently effected cross-linking, as shown for example by the following changes in physical properties:

Table I

| heating (Step A) | Before oxidation and | | After oxidation and heating (Step B) | |
|---|---|---|---|---|
| | Sample I | Sample II | Sample I | Sample II |
| % Weight increase over untreated | 3.0 | 2.83 | — | — |
| Sulfur content % | 0.58 | 0.58 | — | — |
| Dry Crease Recovery Angle (W + F) | 190 | 191 | 223 | 205 |
| Wet Crease Recovery Angle (W + F) | 192 | 195 | 230 | 227 |
| Warp Tensile Strength (lbs.) | 57 | 56 | 44 | 46 |
| Warp Tear Strength (lbs.) | 1.6 | 1.6 | 1.4 | 1.4 |

Table II

|  | Untreated Control | Before heating (Product of Example 16A) | After heating (Product of Example 16B) |
|---|---|---|---|
| Dry Crease Recovery Angle (W + F) | 175 | 170 | 245 |
| Wet Crease Recovery Angle (W + F) | 169 | 190 | 249 |

The crease recovery angle was determined by the method described in the Technical Manual of the American Association of Textile Chemists and Colorists, 1960 edition, pp. 165–167, Tentative Test Method 66–1959, ASTM designation D 1295-53T.

It is apparent from the results given above that the properties of the cotton fabric (as illustrated for example by the crease recovery angle) were not significantly altered by the first step (A) of the reaction, while they were greatly improved by the cross-linking reaction which took place in the second step (B).

EXAMPLE 17

Reactions of 2 methoxyethyl sulfonylethyl pyridinium chloride (product of Example 7) with Cotton Fabric. A. Samples of 80 × 80 print cloth were padded with 40 and 20 percent solution of the product of example 7 to give 36.6 and 18.4 percent reagent, based on the weight of the dry fabric, respectively. The samples were dried and padded with NaOH according to the procedure of example 16A. The mol ratio NaOH NaOh to reagent was thus 1.19 and 1.19 respectively. The samples were rolled, wrapped in polyethylene sheeting and allowed to stand at room temperature for 30 minutes. After the reaction was completed, the fabrics were rinsed in a 1 percent acetic acid solution then washed in a detergent solution at 60°–70°C., rinsed in cold water, dried, conditioned and weighed analytically to determine the weight increase due to treatment. B. The physical properties of the fabrics were determined and then the fabrics were aftertreated with a 3 percent solution of potassium bicarbonate, dried at 80°C. and cured for 3 minutes at 150°C. Routine rinse and wash followed the curing step and the changes in physical properties were determined.

The results obtained by the procedures described in 17(A) and 17(B) are summarized below.

It is again apparent that the introduction of side chains does not change the properties of the fabric significantly either for low (2.6 percent) or relatively high (6.5 percent) weight increases, while the cross-linking step produces massive changes in fabric properties, the changes being proportional to the number of side chains present (as indicated by the weight increase) and capable of entering into the cross-linking reaction.

EXAMPLE 18

Reaction of 2 methoxyethyl thiosulfatoethyl sulfone (product of Example 8) with Cotton Fabric.

A. A sample of 80 × 80 cotton print cloth was padded with an aqueous solution of the reagent to give 0.2 gram of reagent per gram of fabric, and dried at 80°–90°C. The fabric was then padded with a 4 percent NaOH solution at 75.5 percent wet pickup, giving 0.03 gram of NaOH per gram of fabric. This was equivalent to 1.08 mols of NaOH per mol of reagent. The wet fabric was rolled, wrapped in polyethylene sheeting and allowed to stand for 30 minutes at room temperature. After this reaction period, the fabric was rinsed in a 1 percent solution of acetic acid, then washed in detergent solution at 60°–70°C., rinsed in water, dried, conditioned and weighed to determine the weight increase.

B. The physical properties of the fabric were determined and the fabric was then treated with a solution of potassium bicarbonate, dried at 80°–90°C., cured for 3 minutes at 150°C. and washed. The change in physical properties resulting from treatments (A) and (B) was as follows:

Table IV

|  | Before heating Example 18(A) | After heating Example 18(B) |
|---|---|---|
| % Weight increase over untreated | 3.15 | — |
| Dry Crease Recovery Angle (W + F) | 171 | 244 |
| Wet Crease Recovery Angle (W + F) | 180 | 246 |
| Warp Tensile Strength (lbs.) | 59 | 39 |
| Warp Tear Strength (lbs.) | 1.6 | 1.0 |

EXAMPLE 19

Reactions of 2 methoxyethyl 2' thiosulfatoethyl sulfone (product of Example 8) with regenerated cellulose (rayon) fabric.

Table III

|  | Untreated Control | Before heating Example 17(A) |  | After heating Example 17(B) |  |
|---|---|---|---|---|---|
| Reagent concentration % based on weight of fabrics | 0 | 36.6 | 18.4 |  |  |
| Weight increase | 0 | 6.5 | 2.6 | — | — |
| Dry Crease Recovery Angle (W + F) | 175 | 181 | 166 | 285 | 239 |
| Wet Crease Recovery Angle (W + F) | 169 | 190 | 181 | 290 | 240 |
| Warp Tensile Strength (lbs.) | 56 | 55 | 56 | 27 | 29 |
| Warp Tear Strength (lbs.) | 1.6 | 1.5 | 1.6 | 0.9 | 1.1 |

A. A sample of viscose rayon fabric was padded with an aqueous solution of the reagent to give 0.2 gram of reagent per gram of fabric, and dried at 80°–90°C. The fabric was then treated with a 4.7 percent solution of postassium hydroxide at 95 percent wet pickup, giving a 1.15 mol ratio of KOH to reagent on the fabric. The fabric was rolled, wrapped in polyethylene sheeting and allowed to stand wet at room temperature for 30 minutes. It was then neutralized in 1 percent acetic acid, washed, dried, conditioned and weighed.

B. The physical properties were determined, and the fabric was then treated with a 1% solution of potassium bicarbonate, dried at 80°–90°C., and cured for 3 minutes at 150°C. After washing, the change in physical properties resulting from cross-linking was determined. The changes in physical properties were essentially nil after steep (A), but very considerable after step (B).

EXAMPLE 20

Reactions of 2-methoxyethyl sulfonylethyl pyridinium chloride (product of Example 7) with Regenerated Cellulose.

When the procedures of example 19 were repeated, employing the product of example 7 instead of the product of example 8, the following results were obtained:

Table V

|  | Untreated Rayon | Before heating Example 20(A) | After heating Example 20(B) |
| --- | --- | --- | --- |
| % Weight increase | 0 | 7.4 | — |
| % Sulfur content | 0 | 1.9 | 1.9 |
| % Methoxy content | 0 | 1.8 | — |
| Dry crease recovery angle (W + F) | 203 | 188 | 220 |
| Wet crease recovery angle (W + F) | 181 | 182 | 278 |
| Warp tensile strength (lbs.) | 51 | 43 | 31 |
| Warp tear strength (lbs.) | 3.2 | 2.1 | 1.2 |

EXAMPLE 21

Reactions of 2-methoxyethyl 2'aziridinoethyl sulfone (product of example 12) with Cotton Fabric.

Samples of 80 × 80 cotton print cloth were padded with the following aqueous solutions on a laboratory padder:

Solution (A) containing 15 percent of the product of example 12 + 3.9 percent KHCO$_3$
Solution (B) containing 15 percent of the product of example 12 + 7.8 percent KHCO$_3$
Solution (C) containing 7.5 percent of the product of example 12 + 3.9 percent KHCO$_3$ The wet pickup was 95 percent for solutions (A) and (B) and 88 percent for solution (C) corresponding to 14.2 and 6.6 percent reagent respectively, based on the weight of the fabric. The samples were dried at 50°C. and cured for 3 minutes at 150°C., then thoroughly washed with distilled water. The weight increase for the above samples was: for sample (A), 7.9 percent (67 percent yield); (B), 7.4 percent; and (C), 4.0 percent (73 percent yield). After this treatment the cellulose contained the side chain reaction product

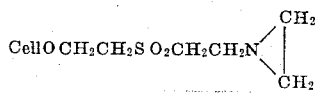

Cross-links were formed by treating portions of samples (A) and (C) with 0.8 percent and 0.4 percent solutions of zinc fluoroberate respectively, drying at 80°C., curing for 5 minutes at 150°C, and washing. The acid catalyzed step induced opening of the aziridine ring, and formation of a cross-linked product

which exhibited greatly enhanced crease recovery over the side chain reaction product formed in the alkali catalyzed first step.

EXAMPLE 22

Reactions of 2-methoxyethyl sulfonylethyl pyridinium chloride (product of example 7) with cotton and rayon.

A. Cotton yarn skeins were padded with a 25 percent aqueous solution of a methoxyethyl sulfonylethyl pyridinium chloride (the product of example 7) to give 19.95 percent reagent based on the weight of yarn. After drying at 80–90°C., the skeins were padded with a 5 percent solution of NaOH to give 5.25 percent NaOH based on the weight of the yarn. The mol ratio of NaOH to reagent was thus 1.75. The skeins were wrapped in polyethylene sheeting and allowed to stand at room temperature for 30 minutes. They were then rinsed in 1 percent acetic acid and washed in a non-ionic detergent solution at 60–70°C., rinsed in cold water, conditioned and weighed analytically to determine the weight increase due to the treatment. The yarn skeins were knitted into tubing which was then padded with a 3 percent KHCO$_3$ solution, dried at 80°C. and cured for 3 minutes at 150°C. Routine rinse and wash followed the curing step and the changes in physical properties were determined.

B. Rayon yarn skeins were padded with a 25 percent solution of methoxyethyl sulfonylethyl pyridinium chloride (product of example 7). After drying at 80°–90°C., the skeins were padded with a 6 percent solution of KOH. The mol ratio of KOH to reagent present on the yarn was 1.35. The skeins were wrapped in polyethylene sheeting and allowed to stand at room temperature for 30 minutes. After this reaction period, the skeins were rinsed in 1 percent acetic acid and washed in a non-ionic detergent solution at 60–70°C., rinsed, dried, and weighed analytically to determine the weight increase.

The treated skeins were knitted into tubing, padded with a 3 percent solution of KHCO$_3$, dried at 80°C., and cured for 3 minutes at 150°C. Routine rinse and wash followed the curing step and the changes in the physical properties of the yarn were determined.

The following table summarizes the changes in physical properties observed as a result of the treatments described in examples 22(A) and 22(B).

Table VI

| Yarn Sample | % Elongation | Tensile Strength Grams |
|---|---|---|
| Cotton, untreated | 4.9 | 312 |
| Cotton, side chain reacted (Ex 22(A) before knitting) | 5.0 | 278 |
| Cotton, cross-linked (Ex. 22(A) yarn from knitted cured fabric) | 3.7 | 188 |
| Rayon, untreated | 10.7 | 289 |
| Rayon, side chain reacted (Ex. 22(B) before knitting) | 10.7 | 244 |
| Rayon, cross-linked (Ex. 22(B) yarn from knitted cured fabric) | 10.8 | 237 |

EXAMPLE 23

Reactions of 2-methoxyethyl sulfonylethyl pyridinium chloride (Product of Example 7) with Cotton.

A. A sample of 1.5 inch Pima cotton fiber was carded to give a web suitable for padding treatment. The web was encased in Dacron polyester sheeting and padded with a 25 percent solution of 2-methoxyethyl sulfonylethyl pyridinium chloride (product of example 7) to give 45 percent reagent on the weight of fiber. After drying at 80°–90°C. the web was padded with a 5 percent solution of NaOH to give 7.5 percent NaOH on the weight of the fiber. The mol ratio of NaOH to reagent present on the fiber was 1.1 The fiber sample was wrapped in polyethylene sheeting and allowed to stand at room temperature for 30 minutes. After this reaction period, the fiber web was rinsed in 1 percent acetic acid, then washed in warm water, rinsed and dried. The cotton fiber was processed without difficulty by carding again, drawing, spinning at 7,500 RPM and knitting. The knitted fabric so obtained was padded with a 3 percent solution of $KHCO_3$, dried at 80°C. and cured for 3 minutes at 150°C. Routine rinsing and washing followed the curing step, and the physical properties of the yarn manufactured from the treated fiber were determined before and after the cross-linking step which was carried out after knitting.

Table VII

| Sample | % Elongation | Tensile Strength Grams |
|---|---|---|
| Cotton yarn prepared from untreated fiber (control) | 7.9 | 349 |
| Cotton yarn prepared from side chain reacted fiber (Ex. 23A) | 6.6 | 276 |
| Cotton yarn removed from knitted cured fabric (Ex. 23A) | 5.0 | 179 |

B. An attempt was made to obtain results comparable to those outlined in example 23(A) by cross-linking cotton fiber in a single step, and subsequently converting the treated fiber into yarn and knitted fabric. For this purpose, a sample of the same 1.5 inch Pima cotton fiber used in example 23(A) was carded to give a web suitable for padding treatment. The web was encased in Dacron polyester sheeting and padded with an aqueous solution containing 6 percent bis(beta hydroxyethyl) sulfone and 3.9 percent $KHCO_3$ as catalyst. 10 percent cross-linking agent was deposited based on the weight of the cotton fiber.

After drying at 80°–90°C., the web was cured at 150°C. for 3 minutes. Routine rinse and wash followed the curing. An attempt was made to process the treated fiber sample into yarn and knitted fabric by the procedure described in Example 23(A). The carding did not present unusual difficulties, but the drawing resulted in an unsatisfactory web which had a flaky appearance from fibers dispersed throughout. Spinning of this web into yarn was extremely difficult. Even when the spindle speed was dropped from 7,500 RPM (which was the speed used in Example 23(A) to 5,500 RPM, the end would not stay up for any length of time. Some yarn was spun with great difficulty, but it was so weak that it could not be knitted.

The experiments described in Example 23 illustrated the great advantage of the invention, namely the possibility of introducing a cross-linking reagent into fiber, prior to processing, by reacting one functional group only, and without altering the behavior of the fiber in processing, and completing the crosslinking reaction at any desired stage in the manufacturing process.

EXAMPLE 24

Reaction of 2-methoxyethyl vinyl sulfone with Viscose Solution

2-Methoxyethyl vinyl sulfone (MVS – product of example 9) was mixed with samples of viscose solution which had an estimated cellulose content of 7.5 percent.

After various reaction times at room temperature the modified cellulose polymer was precipitated in dilute $H_2SO_4$ solution, washed with water, neutralized with $Na_2CO_3$ solution, thoroughly washed and dried in a vacuum desiccator.

The following results were obtained in this experiment:

Table VIII

| | % MVS on weight of solution | Reaction time minutes | % Polymer Yield | % S in modified Polymer |
|---|---|---|---|---|
| A | 5 | 10 | 89 | 1.5 |
| B | 5 | 30 | 92 | 1.6 |
| C | 10 | 10 | 90 | 2.4 |
| D | 10 | 30 | 93 | 2.6 |

EXAMPLE 25

Reaction of 2-Methoxyethyl vinyl sulfone with Cotton Fabric

A. Samples of 80 × 80 print cloth were padded with an aqueous solution of the product of example 9 to give 0.08 gram of reagent per gram of fabric. Without drying the fabric was then padded with a 1.3 percent NaOH solution saturated with $Na_2SO_4$. The wet fabric was rolled, wrapped in polyethylene sheeting and allowed to stand for 60 minutes at room temperature. After this reaction period, the fabric was rinsed in a 1 percent solution of acetic acid then washed in detergent solution at 60°–70°C, rinsed in water, dried, conditioned and weighed to determine the weight increase.

B. The physical properties of the fabric were determined and the fabric was then treated with a 3.0 percent solution of potassium bicarbonate, dried at 80°–90°C., cured for 3 minutes at 150°C. and washed. The change in physical properties resulting from treatments (A) and (B) was as follows:

Table IX

|  | Before Step B | After Step B |
|---|---|---|
| % Weight increase over untreated | 3.0 | — |
| % Sulfur content | 0.57 | 0.55 |
| % Methoxyl content | 0.58 | 0.36 |
| Dry Crease Recovery Angle (W + F) | 184 | 245 |
| Wet Crease Recovery Angle (W + F) | 186 | 237 |
| Warp Tensile Strength (lbs.) | 56 | 38 |
| Warp Tear Strength (lbs.) | 1.6 | 1.1 |

EXAMPLE 26

Reaction of 2-Methoxyethyl vinyl sulfone with Regenerated Cellulose (viscose rayon) Fabric.

When the procedures of example 25 were repeated employing viscose rayon challis fabric instead of cotton print cloth, 0.1 gram of the product of example 9 per gram of fabric was deposited by padding from an aqueous solution. After completing the treatment, the following results were obtained:

Table X

|  | Before Heating | After Heating |
|---|---|---|
| % Weight increase over untreated | 5.10 | — |
| % Sulfur content | 1.24 | 1.21 |
| % Methoxyl content | 1.14 | 0.61 |
| Dry Crease Recovery Angle (W + F) | 209 | 266 |
| Wet Crease Recovery Angle (W + F) | 167 | 248 |
| Warp Tensile Strength (lbs.) | 42 | 33 |
| Warp Tear Strength (lbs.) | 3.1 | 1.4 |

EXAMPLE 27

Reaction of 2-Methoxyethyl vinyl sulfone with Filament Rayon Yarn

Samples of filament rayon yarn (Type 1173 American Enka 300/60 - 2.1 S and Type 1141 American Enka 75/30 - 2.55 S) knitted into tubes were padded with an aqueous solution of the product of example 9 to give 0.20 and 0.11 gram of reagent per gram of yarn.

Without intermediate drying the samples having 0.20 gram of reagent per gram of yarn were padded with 3.0 percent KOH solution saturated with $Na_2SO_4$ and the samples having 0.11 gram of reagent per gram of yarn were padded wth 1.5 percent KOH solution saturated with $Na_2SO_4$. The samples were wrapped in polyethylene sheeting and allowed to stand wet at room temperature for 30 minutes. They were then neutralized in 1 percent acetic acid, washed and dried.

The sulfur content of the samples was as follows:

|  | Gram of Reagent per Gram of Yarn | % Sulfur |
|---|---|---|
| Type 1173 | 0.20 | 1.8 |
| Type 1173 | 0.11 | 1.3 |
| Type 1141 | 0.20 | 1.8 |
| Type 1141 | 0.11 | 1.0 |

EXAMPLE 28

Reaction of the Na Salt of 2-Methoxyethyl sulfonylethyl sulfate with Cotton Fabric.

A. A smaple of 80 × 80 cotton print cloth was padded with a 24 percent aqueous solution of the product of example 11 at 100 percent wet pickup so as to deposit 0.24 gram of reagent per gram of fabric and dried in a forced draft oven at 80–90°C. The fabric was then padded with a 4.2 percent solutio of NaOH saturated with NaCl. The wet pickup was 104 percent, giving 0.043 gram of NaOH per gram of fabric. This was equivalent to 1.22 mols of NaOH per mol of reagent on the fabric. After the NaOH treatment, the wet fabric was rolled smoothly on a rubber core, wrapped in polyethylene sheeting and allowed to stand for 30 minutes at room temperature. After this reaction period, the fabric was rinsed in a 1 percent aqueous solution of acetic acid, then washed in detergent solution at 60–70°C, rinsed in water, dried, conditioned and weighed to determine the weight increase.

B. The physical properties of the fabric were determined and the fabric was then treated by padding with a 3 percent solution of potassium bicarbonate, dried at 80°–90°C, cured for 3 minutes at 150°C and washed. The changes in physical properties resulting from treatments (A) and (B) are tabulated below.

Table XI

|  | Untreated | Before Step (B) | After Step (B) |
|---|---|---|---|
| % Weight Increase over Untreated | — | 4.79 | — |
| Dry Crease Recovery Angle (W + F) | 146 | 179 | 254 |
| Wet Crease Recovery Angle (W + F) | 167 | 182 | 252 |
| Warp Tensile Strength (lbs.) | 58 | 54 | 33 |
| Warp Tear Strength (lbs.) | 1.9 | 1.6 | 1.1 |
| % Sulfur | 0.0 | 0.80 | 0.77 |
| % $OCH_3$ | 0.0 | 0.85 | 0.32 |

EXAMPLE 29

Reaction of the Na Salt of 2-Methoxyethyl sulfonylethyl sulfate with Rayon Fabric.

A. A sample of conditioned and weighed rayon challis fabric was padded with a 25 percent aqueous solution of the product of example 11 at 120 percent wet pickup to give 0.3 gram of reagent per gram of fabric, and dried at 80°–90°C. The fabric was then padded with a 5.7 percent KOH solution saturated with NaCl at 130 percent wet pickup giving 0.074 gram of KOH per gram of fabric. This was equivalent to 1.14 mols of KOH per mol of reagent. The wet fabric was rolled smoothly on a rubber core, wrapped in polyethylene sheeting and allowed to stand for 30 minutes at room temperature. After this reaction period, the fabric was rinsed in a 1 percent aqueous solution of acetic acid, then washed in detergent solution at 60°–70°C., rinsed in water, dried, conditioned and weighed to determine the weight increase.

B. The physical properties of the fabric were determined and the sample was then treated by padding with a 3 percent aqueous solution of potassium bicarbonate, dried at 80°–90°C., cured for 3 minutes at 150°C. and washed. The changes in physical properties resulting from treatments (A) and (B) were as follows:

Table XII

|  | Untreated | Before Step (B) | After Step (B) |
|---|---|---|---|
| % Weight Increase over Untreated | — | 7.78 | — |
| Dry Crease Recovery Angle (W + F) | 191 | 216 | 257 |
| Wet Crease Recovery Angle (W + F) | 135 | 176 | 264 |
| Warp Tensile Strength (lbs.) | 44 | 40 | 31 |
| Warp Tear Strength (lbs.) | 3.5 | 2.2 | 1.4 |
| % Sulfur | 0.0 | 1.45 | 1.48 |
| % OCH$_3$ | 0.0 | 1.64 | 0.90 |

EXAMPLE 30

Reaction of the Na Salt of 2-methoxyethyl sulfonylethyl sulfate with Spun Rayon Yarn.

A. A sample of 19.5/1 denier spun rayon yarn was knitted into tubing. The tube was padded with an aqueous solution of the product of example 11 to give 0.36 gram of reagent per gram of yarn and dried at 80°–90°C. The tubing was then padded with a 6 percent KOH solution saturated with NaCl at 142 percent wet pickup, giving 0.081 gram of KOH per gram of fabric. This was equivalent to 1.13 mols of KOH per mole of reagent on the fabric. The wet knitted fabric was rolled, wrapped in polyethylene sheeting and allowed to stand for 30 minutes at room temperature. After this reaction period, it was rinsed in a 1 percent solution of acetic acid then washed in detergent solution at 60°–70°C., rinsed in water, dried, conditioned and weighed to determine the weight increase.

B. The knitted tubes were de-knitted, prepared for weaving, and were used as filling yarn for a fabric in which the warp was 70/34/5Z semi-dull nylon yarn.

The filling physical properties of the fabric were determined and the fabric was then treated by padding with a 3 percent solution of potassium bicarbonate, dried at 80°–90°C, cured for 3 minutes at 150°C and washed. The change in the physical properties resulting from the alkaline catalyzed heat treatment were as follows:

Table XIII

|  | Before Heating | After Heating |
|---|---|---|
| % Weight Increase (knitted tube) | 7.48 | — |
| Dry Crease Recovery Angle (Filling) | 82 | 104 |
| Filling Tensile Strength (lbs.) | 42 | 37 |
| Filling Tear Strength (lbs.) | 6.5 | 5.6 |
| % Sulfur (filling yarns) | 1.63 | 1.49 |
| % OCH$_3$ (filling yarns) | 1.60 | 1.05 |
| Filling shrinkage % (5 Launderings Tumble Dried) | 8.0 | 1.5 |

EXAMPLE 31

Reaction of the sodium salt of 2-methoxyethyl sulfonylethyl sulfate with Cotton Fiber.

A sample of 1½ inch Pima cotton fiber which was previously scoured in a dilute NaOH solution to remove waxes and other non cellulosic contaminants was carded to give a web suitable for padding treatment. The web padded with a 42% aqueous solution of the product of example 11 at 260 percent wet pickup to give 1.09 grams of reagent per gram of fiber. After drying at 80°–90°C. the web was padded with a 14 percent solution saturated with NaCl to give 0.22 gram of NaOH per gram of fiber. The mol ratio of NaOH to reagent present on the fiber was 1.36. The fiber was wrapped in polyethylene sheeting and allowed to stand at room temperature for 30 minutes. AFter this reaction period, the fiber web was rinsed in 1 acetic acid solution, washed in warm water, rinsed and dried in an oven at 80°–90°C.

Sulfur content of the modified cellulose fiber obtained was 2.59 percent corresponding to 12 percent weight increase.

EXAMPLE 32

Dyeing of Cotton Fabric reacted with the sodium salt of 2-methyoxyethyl sulfonylethyl sulfate (product of Example 11).

A sample of 80 × 80 print cloth which was treated with the reagent according to the procedure described in example 28 (A), containing 0.80 percent sulfur and 0.85 percent methoxyl, was dyed with Atlantic Direct Sky Blue A extra conc. direct dyestuff (color index, Direct Blue 15) to a medium blue shade on a steam bath. After dyeing, the sample was washed in a detergent solution at 60°–70°C., rinsed in water and dried.

The shade and depth of the color of the dyed samples were the same as that of an untreated sample dyed in the same dybath.

The colorfastness of the dyed fabrics was determined and the fabrics were then treated with a 3 percent solution of potassium bicarbonate, dried at 80°–90°C., cured for 3 minutes at 150°C. and washed.

|  |  | Before Heating | After Heating |
|---|---|---|---|
| Colorfastness to Laundering (AATCC Test 3A — 160°F) | Treated | 1 | 3 |
|  | Untreated | 1 | 1 |

This example shows that the dyeing behavior of the modified cotton fabric before completing the crosslinking reaction in the heating step is the same as for untreated cotton fabric. Also, crosslinking increases the colorfastness to laundering of the direct dye from a rating of 1 to a rating of 3.

EXAMPLE 33

Permanent Creasing by using Non Volatile Base as Catalyst.

A sample of 80 × 80 print cloth which was treated with 2-methoxyethyl vinyl sulfone (product of example 9) according to the procedure described in example 25(A) and had a weight increase of 4.5 percent over the untreated fabric and an untreated control sample were treated with 3.0 percent solution of potassium bicarbonate, dried at 80°C., creased in the warp direction, ironed for 5 minutes with the iron set at 150°C., neutralized with 1 percent solution of acetic acid, rinsed and dried. The physical properties of the samples were as follows:

Table XIV

|  | After 1 Laundering | | After 30 Launderings | |
| --- | --- | --- | --- | --- |
|  | Untreated | Treated | Untreated | Treated |
| Dry Crease Recovery Angle (W + F) | 140 | 285 | 145 | 281 |
| Wet Crease Recovery Angle (W + F) | 162 | 260 | 167 | 259 |
| Crease Retention Rating | 1.0 | 5.0 | 1.0 | 5.0 |

EXAMPLE 34

Permanent Creasing by using Volatile Base as Catalyst.

A sample of 80 × 80 print cloth, which was treated with 2-methoxyethyl vinyl sulfone (product of example 9) according to the procedure described in example 25(A) and had a weight increase of 4.0 percent over the untreated fabric was treated with a 5 percent aqueous solution of tetraethyl ammonium hydroxide, dried at 80°C., creased in the warp direction and ironed for 5 minutes with the iron set at 150°C.

The physical properties of the sample were as follows:

|  | After 1 Laundering |
| --- | --- |
| Dry Crease Recovery Angle (W + F) | 190 |
| Wet Crease Recovery Angle (W + F) | 244 |
| Crease Retention Rating | 5.0 |

The quaternary ammonium hydroxide catalyst dissociated into volatile by-products during ironing, and washing of the sample to remove the base after heating was not necessary.

EXAMPLE 35

20.0 grams of corn starch (Corn Product Co., N.Y.) were added to a mixture of 180 grams of dioxane and 10 mls. of 5 N aqueous NaOH, and stirred at room temperature for 10 minutes. 2 grams of 2-methoxyethyl vinyl sulfone were added to the slurry and the mixture was stirred for 1 hour then allowed to stand overnight at room temperature. The slurry was filtered and the solid was dispersed in a mixture of 60 grams of dioxane, 30 grams of water and 10 grams of glacial acetic acid in order to neutralize the residual NaOH. After filtering, the solid was washed repeatedly with a dioxane-water mixture and dried. 1.0 gram of the modified starch product so obtained was easily dissolved in an aqueous NaOH solution (containing 8 g/liter of NaOH) at 100°C. The gelatinous mass formed was cast into a film which was dried at 50°C. for 30 minutes then cured for 8 minutes at 150°C. in order to effect cross-linking. The cured, cross-linked starch could no longer be dissolved in the aqueous NaOH solution (8 g/liter NaOH).

EXAMPLE 36

20 grams of polyvinyl alcohol resin (marketed under the trade name of Elvanol 72-60 by E. I. du Pont de Nemours & Co.) were added to a mixture of 180 grams of dioxane and 10 mls. of 5 N aqueous NaOH, and stirred at room temperature for 10 minutes. 2 grams of 2-methoxyethyl vinyl sulfone were added to the resulting slurry, and the reaction mixture was stirred for 1 hour then allowed to stand overnight at room temperature. The slurry was filtered, and the solid was dispersed in a mixture of 60 grams of dioxane, 30 grams of water and 10 grams of glacial acetic acid in order to neutralize the residual NaOH. After filtering, the solid was washed repeatedly with a dioxane-water mixture and dried.

1 gram of the modified polyvinyl alcohol product so obtained was dissolved in a mixture of 9 grams of ethylene glycol and 9 grams of aqueous NaOH solution (containing 8 g/liter NaOH) at 109°C. A film was cast from this solution, dried at 60°C. for 2 hours and then cured for 8 minutes at 150°C. After the curing step, the modified (cross-linked) polyvinyl alcohol could no longer be dissolved in the ethylene glycol-aqueous NaOH mixture at 109°C.

EXAMPLE 37

A. Preparation of Reactive Size from Corn Starch 50 grams of corn starch were slowly added with continuous stirring to a solution containing 1.0 gram NaOH and 90 mls. of water. 10.0 grams (0.067 mol) of 2-methoxyethyl vinyl sulfone (product of example 9) were added dropwise at room temperature to the starch suspension. After 1 hour reaction time at room temperature, 250 mls. water were added and the pH of the mixture was adjusted to 3.0 by adding 0.2 N HCl solution. By adding 500 mls. acetone a precipitate was obtained. This was filtered, washed and dried. The modified starch had a 2.6 percent S content.

10 grams of the modified starch were boiled in 140 mls. of water for 1 hour. The viscous 6.6 percent starch solution was stored for 2 weeks without any mildew formation and without any change in viscosity.

Under the same conditions, a 6.6 percent viscous solution prepared from unmodified corn starch showed considerable mildew growth and gelatinization after 6 days.

B. Reaction of Modified Starch with Cotton Fabric

A sample of 100 percent cotton fabric known as twist twill was padded with an aqueous dispersion containing 4.0 percent modified starch (product of example 37(A)) and 3.0 percent KHCO₃. The wet pickup was 60 percent. Another sample of the same fabric was padded with an aqueous dispersion containing 4.0 percent unmodified corn starch and 3.0 percent KHCO₃ at 60 percent wet pickup.

Both samples were dried at 80°C., cured at 150°C. for 3 minutes, and washed.

The flexural rigidity (average of warp and filling) of the sample treated with modified corn starch decreased by only 27 percent after 10 machine launderings, while the rigidity of the sample treated with unmodified starch decreased by 48 percent.

(Flexural rigidity was measured according to the Cantilever Test Method, ASTM D1388-55T).

This indicated that chemical bonding of the starch to the fabric had been achieve.

EXAMPLE 38

A. Preparation of Reactive Size from Polyvinyl Alcohol 42.0 grams of polyvinyl alchohol (Elvanol 71-30, product of E. I. du Pont de Nemours & Co.) were added slowly to 260 mls. of boiling water with continuous stirring. After the viscous PVA solution cooled down, 4.0 grams of NaOH dissolved in 20 mls. of water and then 8.4 grams (0.056 mol) of 2-methoxyethyl vinyl sulfone (product of example 9) were added dropwise at room temperature. AFter 30 minutes reaction time at room temperature, 250 mls. of water were added and the pH of the mixture was adjusted to 3.0 with 0.2 N HCl solution. By adding 500 mls. of ethanol, a precipitate was obtained. This was filtered, washed and dried in a vacuum oven at 40°C. The sulfur content of the modified PVA was 2.0 percent.

By adding 10 grams of the modified PVA to 90 mls. of boiling water with continous stirring, a homogeneous viscous solution was obtained.

B. Reaction of Modified PVA with Cotton Fabric.

A sample of 100 percent cotton fabric known as twist twill was padded with an aqueous dispersion containing 4.0 percent of modified polyvinyl alcohol (product of example 38(A)) and 3.0 percent KHCO₃. The wet pickup was 60 percent.

Another sample of the same fabric was padded with an aqueous dispersion containing 4.0 percent unmodified PVA (Elvanol 31-40) and 3.0 percent KHCO₃ at 60 percent wet pickup.

Both samples were dried at 80°C. and cured at 150°C. for 3 minutes.

The overall flexural rigidity of the sample treated with modified PVA decreased by only 16 percent after 10 machine launderings while the rigidity of the sample treated with unmodified PVA decreased by 78.0 percent.

(Flexural rigidity was mesured by the Cantilever Test Method ASTM D1388-55T).

As is evident from the above examples, the functional group RO- of the modifying or cross-linking agent of Formula I reacts with an active hydrogen of the polymers of polymeric material being treated, such as cellulose, at temperatures of about 100°C. or higher, while the $R^{11}$ radicals

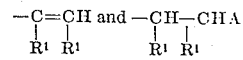

where A is a polar residue derived from a reagent of weak nucleophilic character, will react with an active hydrogen atom of the polymers at ambient temperatures usually under alkaline conditions. When the $R^{11}$ radical of Formula I is either the aziridinyl group or the group

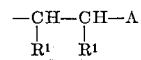

wherein A is an aziridinyl radical, the $R^{11}$ radical will react with an active hydrogen of the polymers under acidic conditions. Thus, stepwise modification or cross-linking of the polymers is accomplished in any desired manner or sequence.

Furthermore, in Formula I, supra, it will be understood that the alkylene group includes methylene, ethylene, butylene, octylene, decamethylene, etc., while the aralkylene group includes —CH₂C₆H₄CH₂—, —C₂H₄C₆H₄C₂H₄—, C₃H₆C₆H₄C₃H₆— —CH₂C₆H₃(CH₃)CH₂—, and the like.

We claim:

1. A compound having the formula

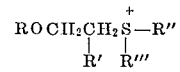

wherein R is lower alkyl,

R' is a member selected from the group consisting of hydrogen and lower alkyl, and R'' is the group

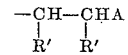

wherein

A is OSO₃⁻ and

R''' is alkyl.

2.

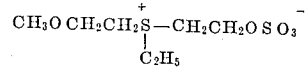

* * * * *

UNITED STATES PATENT OFFICE
CERTIFICATE OF CORRECTION

PATENT NO. : 3,853,940
DATED : December 10, 1974
INVENTOR(S) : GIULIANA C. TESORO ET AL It is certified that error appears in the above-identified patent and that said Letters Patent In column 2, line 19, delete "agent".

Column 6, line 36, the formula should read

-- $C_2H_5OCH_2CH_2SO_2CH_2CH_2CH_2SO_2CH=CH_2$ --

Column 7, line 61, the identification of the "ionization constant" should be -- $<10^{-5}$ --.

Column 8, line 47, "maaterial" should read -- material --

Column 9, line 29, after "state" change the comma to a period.

Column 10, line 9, change "beta-oxyothyl" to -- beta-oxyethyl --.

Column 10, line 42, "betaoxyethyl" should be -- beta-oxyethyl --.

Column 10, line 45, "betaoxyethyl" should be -- beta-oxyethyl --.

UNITED STATES PATENT OFFICE
CERTIFICATE OF CORRECTION

PATENT NO. : 3,853,940
DATED : December 10, 1974
INVENTOR(S) : GIULIANA C. TESORO ET AL It is certified that error appears in the above-identified patent and that said Letters Patent are hereby corrected as shown below:

Column 10, line 65, in the formula, "beta-hydroxyethyl-beta" should be -- beta-hydroxyethyl-beta' --.

Column 11, line 10, change "ankali" to -- alkali --.

Column 12, line 14, change "other" to -- ether --.

Column 13, in Formula (6c), the second compound should be shown as follows:

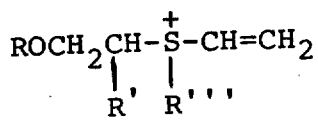

Column 13, line 53, change "be" to -- the --.

Column 13, equation (6d) should be shown as follows:

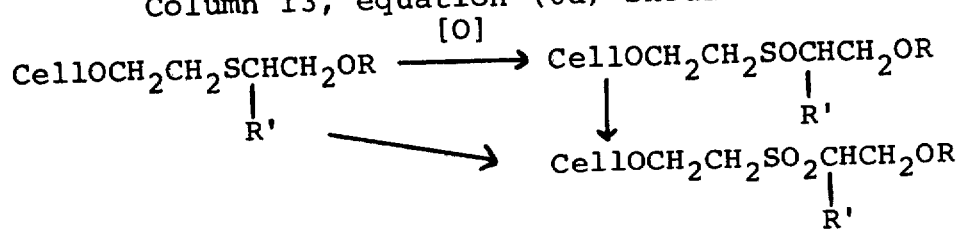

Column 14, line 50, change "betahaloethyl" to -- beta-haloethyl --.

UNITED STATES PATENT OFFICE
CERTIFICATE OF CORRECTION

PATENT NO. : 3,853,940
DATED : December 10, 1974
INVENTOR(S) : GIULIANA C. TESORO ET AL It is certified that error appears in the above-identified patent and that said Letters Patent are hereby corrected as shown below:

Column 15, in formula (7c), the formula for the last compound should be shown as follows

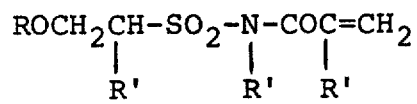

Column 16, in equation (10), insert an arrow going to the right after the formula

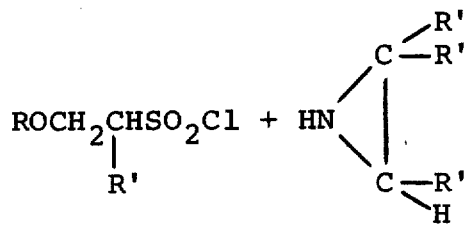

Column 19, line 18, correct -- 40°C --.

Column 19, line 42, correct the formula as follows

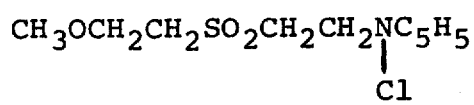

Column 21, line 25, change "electrometic" to -- electrometric --.

Column 23, line 44, delete "solution" (first occurence) and insert -- aqueous --.

UNITED STATES PATENT OFFICE
CERTIFICATE OF CORRECTION

PATENT NO. : 3,853,940
DATED : December 10, 1974
INVENTOR(S) : GIULIANA C. TESORO ET AL It is certified that error appears in the above-identified patent and that said Letters Patent are hereby corrected as shown below:

In Table I, at the bottom of columns 23 and 24, the heading "heating (Step A)" should appear under "Before oxidation and".

Column 25, line 33, delete "NaOH".

In Table III, at the bottom of column 25, under the heading "After heating Example 17(B)" insert two dashes in each column adjacent the entry "Reagent concentration % based on weight of fabrics".

Column 26, line 24, before "solution" insert -- 3% --.

Column 27, line 14, change "steep" to -- step --.

Column 27, Table V, line 36, change "Methoxy" to -- Methoxyl --.

Column 28, line 10, change "fluoroberate" to -- fluoroborate --.

Column 29, line 33, insert a period (.) before "The".

Column 30, line 15, add a second parenthesis after "(A)".

Column 32, line 16, change "smaple" to -- sample --.

Column 32, line 21, change "solutio" to -- solution --

UNITED STATES PATENT OFFICE
CERTIFICATE OF CORRECTION

PATENT NO. : 3,853,940
DATED : December 10, 1974
INVENTOR(S) : GIULIANA C. TESORO ET AL It is certified that error appears in the above-identified patent and that said Letters Patent are hereby corrected as shown below:

Column 33, Table XII, in the column headed "Before Step (B)", adjacent "% $OCH_3$" change "1.64" to -- 1.65

Column 34, line 25, change "AFter" to -- After --.

Column 34, line 26, after "1" insert -- % --.

Column 34, line 47, change "dybath" to -- dyebath --.

Column 37, line 28, change "AFter" to -- After --.

Column 38, line 10, the second formula should be

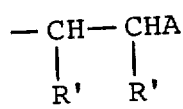

Column 38, line 31, the second formula should be $$-C_3H_6C_6H_4C_3H_6-,$$

Column 38, Claim 1, line 35, the formula should be

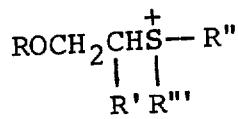

Signed and Sealed this thirtieth Day of March 1976

[SEAL]

Attest:

RUTH C. MASON
Attesting Officer

C. MARSHALL DANN
Commissioner of Patents and Trademarks